(12) United States Patent
Wang et al.

(10) Patent No.: US 10,425,962 B2
(45) Date of Patent: Sep. 24, 2019

(54) PUCCH DESIGN WITH FLEXIBLE SYMBOL CONFIGURATION

(71) Applicant: QUALCOMM Incorporated, San Diego, CA (US)

(72) Inventors: Renqiu Wang, San Diego, CA (US); Yi Huang, San Diego, CA (US); Hao Xu, Beijing (CN); Wanshi Chen, San Diego, CA (US); Peter Gaal, San Diego, CA (US); Wei Zeng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/839,790

(22) Filed: Dec. 12, 2017

(65) Prior Publication Data

US 2018/0167965 A1    Jun. 14, 2018

Related U.S. Application Data

(60) Provisional application No. 62/443,560, filed on Jan. 6, 2017, provisional application No. 62/434,364, filed on Dec. 14, 2016.

(51) Int. Cl.
*H04B 7/00* (2006.01)
*H04W 72/12* (2009.01)
(Continued)

(52) U.S. Cl.
CPC ....... *H04W 72/1278* (2013.01); *H04L 1/0006* (2013.01); *H04L 5/0012* (2013.01); *H04L 5/0044* (2013.01); *H04L 5/0053* (2013.01); *H04W 72/0413* (2013.01); *H04W 72/0466* (2013.01); *H04W 72/121* (2013.01); *H04W 72/1268* (2013.01); *H04L 5/0007* (2013.01);
(Continued)

(58) Field of Classification Search
CPC ......... H04W 72/0413; H04W 72/0446; H04W 72/08; H04W 72/1268
USPC .................. 370/310, 328–330, 345, 437, 458
See application file for complete search history.

(56) References Cited

U.S. PATENT DOCUMENTS 8,634,345 B2 * 1/2014 Yin ....................... H04L 1/0067
                                                                  370/252
9,232,518 B2 * 1/2016 Monzen ................ H04L 1/0015
(Continued)

OTHER PUBLICATIONS

International Search Report and Written Opinion—PCT/US2017/066196—ISA/EPO—dated May 16, 2018.
(Continued)

*Primary Examiner* — Dmitry Levitan
(74) *Attorney, Agent, or Firm* — Loza & Loza, LLP

(57) ABSTRACT

Aspects of the disclosure relate to communication systems, apparatus and methods which enable or support flexible symbol configurations for uplink channels. In one example a method includes performing transmitting first uplink information from a subordinate entity to a scheduling entity in a long burst portion of one or more slots, and transmitting second uplink information from the subordinate entity to the scheduling entity in a combination of long burst and short burst portions of the one or more slots. Each of the one or more slots includes a portion that carries a physical downlink control channel. The second uplink information is transmitted in a physical uplink control channel.

30 Claims, 23 Drawing Sheets

(51) Int. Cl.
  *H04W 72/04* (2009.01)
  *H04L 1/00* (2006.01)
  *H04L 5/00* (2006.01)
  *H04W 72/14* (2009.01)
  *H04L 5/14* (2006.01)

(52) U.S. Cl.
  CPC .......... *H04L 5/0037* (2013.01); *H04L 5/0042* (2013.01); *H04L 5/0048* (2013.01); *H04L 5/0062* (2013.01); *H04L 5/0078* (2013.01); *H04L 5/1469* (2013.01); *H04W 72/14* (2013.01)

(56) References Cited

U.S. PATENT DOCUMENTS

| | | | | |
|---|---|---|---|---|
| 9,854,569 | B2* | 12/2017 | Yang | H04L 5/0053 |
| 10,091,810 | B2* | 10/2018 | Zeng | H04W 72/1215 |
| 2018/0054269 | A1* | 2/2018 | Cui | H04L 27/2676 |
| 2018/0077658 | A1* | 3/2018 | Nory | H04W 52/365 |
| 2018/0098337 | A1* | 4/2018 | Lee | H04W 72/042 |
| 2018/0124815 | A1* | 5/2018 | Papasakellariou | H04L 5/0053 |
| 2018/0132264 | A1* | 5/2018 | Jung | H04L 1/1854 |
| 2018/0167933 | A1* | 6/2018 | Yin | H04W 28/02 |
| 2018/0206226 | A1* | 7/2018 | Zeng | H04L 5/1469 |
| 2018/0213485 | A1* | 7/2018 | Sundararajan | H04W 52/146 |

OTHER PUBLICATIONS

"3rd Generation Partnership Project; Technical Specification Group Radio Access Network; Study on New Radio (NR) Access Technology Physical Layer Aspects (Release 14)", 3GPP Draft; RP-162202 DRAFT TR38.802 (V1.0.0), 3rd Generation Partnership Project (3GPP), Mobile Competence Centre; 650, Route Des Lucioles; F-06921 Sophia-Antipolis Cedex; France, Dec. 4, 2016, XP051183622, Retrieved from the Internet: URL:http://www.3gpp.org/ftp/Meetings_3GPP_SYNC/RAN/Docs/ [retrieved on Dec. 4, 2016], 64 pages.
NTT Docomo Inc: "Workplan for Study on NR Access Technology", 3GPP DRAFT; R1-1612706 Workplan for Study on NR, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 14, 2016-Nov. 18, 2016 Nov. 13, 2016 (Nov. 13, 2016), XP051176649, Retrieved from the Internet: URL:http://www.3gpp.org/ftp/Meetings_3GPP_SYNC/RAN1/Docs/ [retrieved on Nov. 13, 2016], 76 pages.
Partial International Search Report—PCT/US2017/066196—ISA/EPO—dated Mar. 9, 2018.
Qualcomm Incorporated: "UL Control Channels Overview", 3GPP Draft; R1-1610178_UL Control Channels Overview, 3rd Generation Partnership Project (3GPP), Mobile Competence Centre, 650, Route Des Lucioles; F-06921, Sophia-Antipolis Cedex; France, vol. RAN WG1, no. Lisbon, Portugal; Oct. 10, 2016-Oct. 14, 2016, Oct. 1, 2016 (Oct. 1, 2016), pp. 1-3, XP051159978, Retrieved from the Internet: URL: http://www.3gpp.org/ftp/tsg_ran/WG1_RL1/TSGR1_86b/Docs/ [retrieved on Oct. 1, 2016].
Qualcomm Incorporated: "User Multiplexing of DFTs-OFDM and OFDM in Uplink", 3GPP DRAFT; R1-1610114 User Multiplexing of DFTs-OFDM and OFDM in Uplink, 3rd Generation Partnership Project (3GPP), Mobile Competence Centre; 650, Route Des Lucioles; F-06921 Sophia-Antipolis Cedex; France, vol. RAN WG1, No. Lisbon, Portugal; Oct. 10, 2016-Oct. 14, 2016 Oct. 9, 2016 (Oct. 9, 2016), XP051150138, Retrieved from the Internet: URL:http://www.3gpp.org/ftp/Meetings_3GPP_SYNC/RAN1/Docs/ [retrieved on Oct. 9, 2016], 5 pages.

* cited by examiner

PUCCH DESIGN WITH FLEXIBLE SYMBOL CONFIGURATION

PRIORITY CLAIM

This application claims priority to and the benefit of provisional patent application No. 62/434,364 filed in the United States Patent Office on Dec. 14, 2016, and provisional patent application No. 62/443,560 filed in the United States Patent Office on Jan. 6, 2017, the entire content of which application are incorporated herein by reference as if fully set forth below in its entirety and for all applicable purposes.

TECHNICAL FIELD

The technology discussed below relates generally to wireless communication systems, and more particularly, to reconfigurable uplink transmissions for wireless communication and communication methods.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems.

These multiple access technologies have been adopted in various telecommunication standards to provide a common protocol that enables different wireless devices to communicate on a municipal, national, regional, and even global level. For example, fifth generation (5G) New Radio (NR) communications technology is envisaged to expand and support diverse usage scenarios and applications with respect to current mobile network generations. In an aspect, 5G communications technology includes enhanced mobile broadband addressing human-centric use cases for access to multimedia content, services and data; ultra-reliable-low latency communications (URLLC) with strict requirements, especially in terms of latency and reliability; and massive machine type communications for a very large number of connected devices and typically transmitting a relatively low volume of non-delay-sensitive information.

Wireless communication networks are being utilized to provide and support an even broader range of services for various types of devices with different capabilities. While some devices can operate within the available bandwidth of the communication channels, requirements for uplink control channels in devices employing NR access technologies may be unmet or unattainable in conventional network implementations.

As the demand for mobile broadband access continues to increase, research and development continue to advance wireless communication technologies not only to meet the growing demand for mobile broadband access, but to advance and enhance the user experience with mobile communications.

BRIEF SUMMARY OF SOME EXAMPLES

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example a method for selecting a signal is disclosed. The method includes performing transmitting first uplink information from a subordinate entity to a scheduling entity in a long burst portion of one or more slots, and transmitting second uplink information from the subordinate entity to the scheduling entity in a combination of long burst and short burst portions of the one or more slots. Each of the one or more slots may include at least two slots. The second uplink information may be transmitted by transmitting a first portion of the second uplink information in a first slot using first resource blocks, and transmitting a second portion of the second uplink information in a long burst provided in the second slot using second resource blocks that are different from the first resource blocks. In some instances, the one or more slots includes a portion that carries a physical downlink control channel. The second uplink information is transmitted in a physical uplink control channel.

In one example an apparatus is disclosed. The apparatus includes means for transmitting first uplink information from a subordinate entity to a scheduling entity in a long burst portion of one or more slots, and means for transmitting second uplink information from the subordinate entity to the scheduling entity in a long burst portion, a short burst portion or a combination of long burst and short burst portions of the one or more slots. The means for transmitting the second uplink information may be operable to transmit a first portion of the second uplink information in a first slot using first resource blocks, and transmit a second portion of the second uplink information in a long burst provided in the second slot using second resource blocks that are different from the first resource blocks.

In one example a non-transitory computer-readable medium is disclosed. The computer-readable medium stores computer-executable code, including code for causing a computer to transmit first uplink information from a subordinate entity to a scheduling entity in a long burst portion of one or more slots, and transmit second uplink information from the subordinate entity to the scheduling entity in a long burst portion, a short burst portion or a combination of long burst and short burst portions of the one or more slots, each of the one or more slots having at least two slots. The computer-readable medium may store code for causing the computer to transmit a first portion of the second uplink information in a first slot using first resource blocks, and transmit a second portion of the second uplink information in a long burst provided in the second slot using second resource blocks that are different from the first resource blocks.

In one example an apparatus for wireless communication is disclosed. The apparatus includes at least one processor, a transceiver communicatively coupled to the at least one processor, and a memory communicatively coupled to the at least one processor. The processor may be configured to transmit first uplink information from a subordinate entity to a scheduling entity in a long burst portion of one or more slots, and transmit second uplink information from the subordinate entity to the scheduling entity in a long burst portion, a short burst portion or a combination of long burst and short burst portions of the one or more slots. Each of the one or more slots may include at least two slots. The processor may be configured to transmit a first portion of the second uplink information in a first slot using first resource blocks, and transmit a second portion of the second uplink information in a long burst provided in the second slot using second resource blocks that are different from the first resource blocks.

These and other aspects of the invention will become more fully understood upon a review of the detailed description, which follows. Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
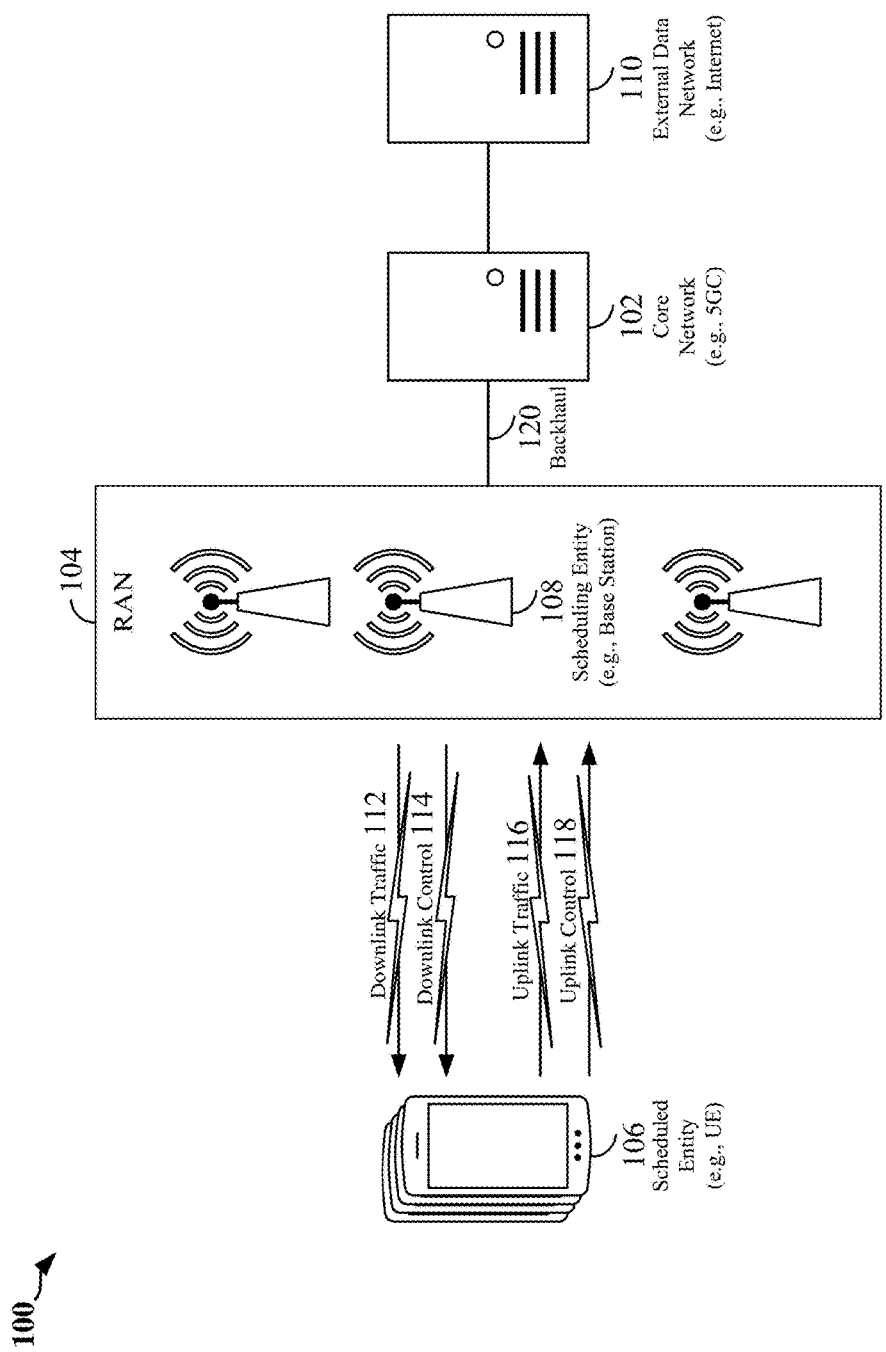
FIG. 1 is a block diagram conceptually illustrating an example of a wireless communication system according to some aspects of the disclosure.

The various concepts presented throughout this disclosure may be implemented across a broad variety of telecommunication systems, network architectures, and communication standards. Referring now to FIG. 1 as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), or some other suitable terminology.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the base station 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a base station 108 may broadcast downlink traffic 112 to one or more scheduled entities 106. Broadly, the base station 108 is a node or device responsible for scheduling traffic in a wireless communication network, including the downlink traffic 112 and, in some examples, uplink traffic 116 from one or more scheduled entities 106 to the base station 108. On the other hand, the scheduled entity 106 is a node or device that receives downlink control information 114, including but not limited to scheduling information (e.g., a grant), synchronization or timing information, or other control information from another entity in the wireless communication network such as the base station 108.

In general, base stations 108 may include a backhaul interface for communication with a backhaul portion 120 of the wireless communication system. The backhaul portion 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
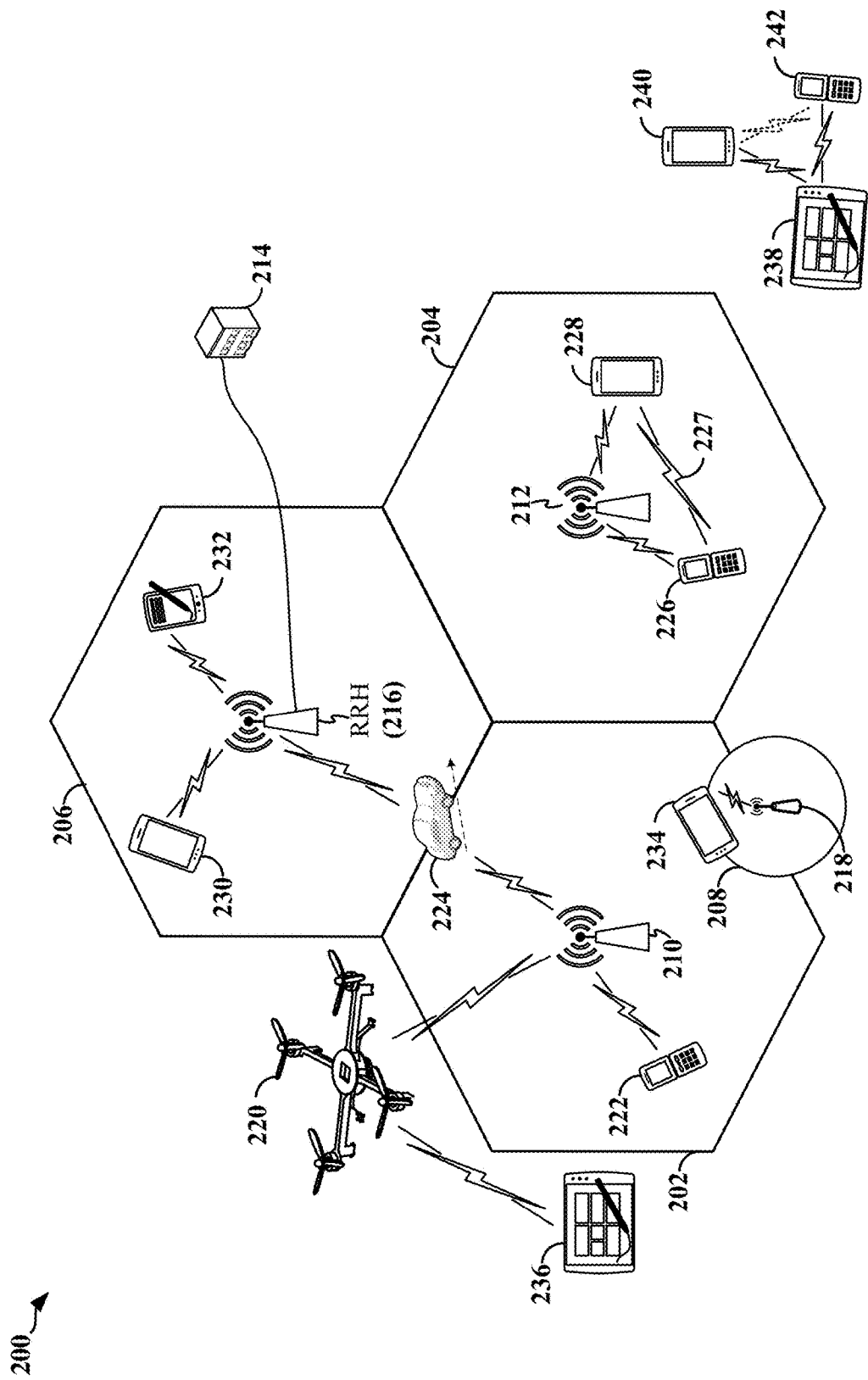
FIG. 2 is a conceptual diagram illustrating an example of a radio access network.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown).

A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

In FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 126 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the scheduling entity/base station 108 described above and illustrated in FIG. 1.

FIG. 2 further includes a quadcopter or drone 220, which may be configured to function as a base station. That is, in some examples, a cell may not necessarily be stationary, and the geographic area of the cell may move according to the location of a mobile base station such as the quadcopter 220.

Within the RAN 200, the cells may include UEs that may be in communication with one or more sectors of each cell. Further, each base station 210, 212, 214, 218, and 220 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; UE 234 may be in communication with base station 218; and UE 236 may be in communication with mobile base station 220. In some examples, the UEs 222, 224, 226, 228, 230, 232, 234, 236, 238, 240, and/or 242 may be the same as the UE/scheduled entity 106 described above and illustrated in FIG. 1.

In some examples, a mobile network node (e.g., quadcopter 220) may be configured to function as a UE. For example, the quadcopter 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another in addition to communicating with the scheduling entity. Thus, in a wireless communication system with scheduled access to time-frequency resources and having a cellular configuration, a P2P configuration, or a mesh configuration, a scheduling entity and one or more scheduled entities may communicate utilizing the scheduled resources.

Uplink and/or downlink control information and/or traffic information may be transmitted in transmission time intervals (TTIs). As used herein, the term TTI may refer to the inter-arrival time of a given schedulable set of data. In various examples, a TTI may be configured to carry one or more transport blocks, which are generally the basic data unit exchanged between the physical layer (PHY) and medium access control (MAC) layer (sometimes referred to as a MAC PDU, or protocol data unit). In accordance with various aspects of the present disclosure, a subframe may include one or more TTIs. Thus, as further used herein, the term subframe may refer to an encapsulated set of information including one or more TTIs, which is capable of being independently decoded. Multiple subframes may be grouped together to form a single frame or radio frame. Any suitable number of subframes may occupy a frame. In addition, a subframe may have any suitable duration (e.g., 250 μs, 500 μs, 1 ms, etc.).

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

Further, the air interface in the radio access network 200 may utilize one or more duplexing algorithms Duplex refers to a point-to-point communication link where both endpoints can communicate with one another in both directions. Full duplex means both endpoints can simultaneously communicate with one another. Half duplex means only one endpoint can send information to the other at a time. In a wireless link, a full duplex channel generally relies on physical isolation of a transmitter and receiver, and suitable interference cancellation technologies. Full duplex emulation is frequently implemented for wireless links by utilizing frequency division duplex (FDD) or time division duplex (TDD). In FDD, transmissions in different directions operate at different carrier frequencies. In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot.

Various aspects of the present disclosure will be described with reference to an OFDM waveform, schematically illustrated in FIG. 3. It should be understood by those of ordinary skill in the art that the various aspects of the present disclosure may be applied to a DFT-s-OFDMA waveform in substantially the same way as described herein below. That is, while some examples of the present disclosure may focus on an OFDM link for clarity, it should be understood that the same principles may be applied as well to DFT-s-OFDMA waveforms.

An air interface that operates using OFDM may be defined according to a two-dimensional grid of resource elements, defined by separation of resources in frequency by defining a set of closely spaced frequency tones or subcarriers, and separation in time by defining a sequence of symbols having a given duration. By setting the spacing between the tones based on the symbol rate, inter-symbol interference can be eliminated. OFDM channels provide for high data rates by allocating a data stream in a parallel manner across multiple subcarriers. In OFDM, to maintain orthogonality of the subcarriers or tones, the subcarrier spacing is equal to the inverse of the symbol period. A scalable numerology refers to the capability of the network to select different subcarrier spacings, and accordingly, with each spacing, to select the corresponding symbol period. The symbol period should be short enough that the channel does not significantly vary over each period, in order to preserve orthogonality and limit inter-subcarrier interference.

Within the present disclosure, a frame refers to a duration of 10 ms for wireless transmissions, with each frame consisting of 10 subframes of 1 ms each. On a given carrier, there may be one set of frames in the UL, and another set of frames in the DL. Referring now to FIG. 3, an expanded view of an exemplary DL subframe 302 is illustrated, showing an OFDM resource grid 304. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers or tones.

The resource grid 304 may be used to schematically represent time-frequency resources for a given antenna port. That is, in a multiple-input multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

A UE generally utilizes only a subset of the resource grid 304. An RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs.

An expanded view of one of the slots 310 illustrates the slot 310 including a control region 312 and a data region 314. In general, the control region 312 may carry control channels (e.g., PDCCH), and the data region 314 may carry data channels (e.g., PDSCH or PUSCH). Of course, a slot may contain all DL, all UL, or at least one DL portion and at least one UL portion. The simple structure illustrated in FIG. 3 is merely exemplary in nature, and different slot structures may be utilized, and may include one or more of each of the control region(s) and data region(s).

Figure 3:
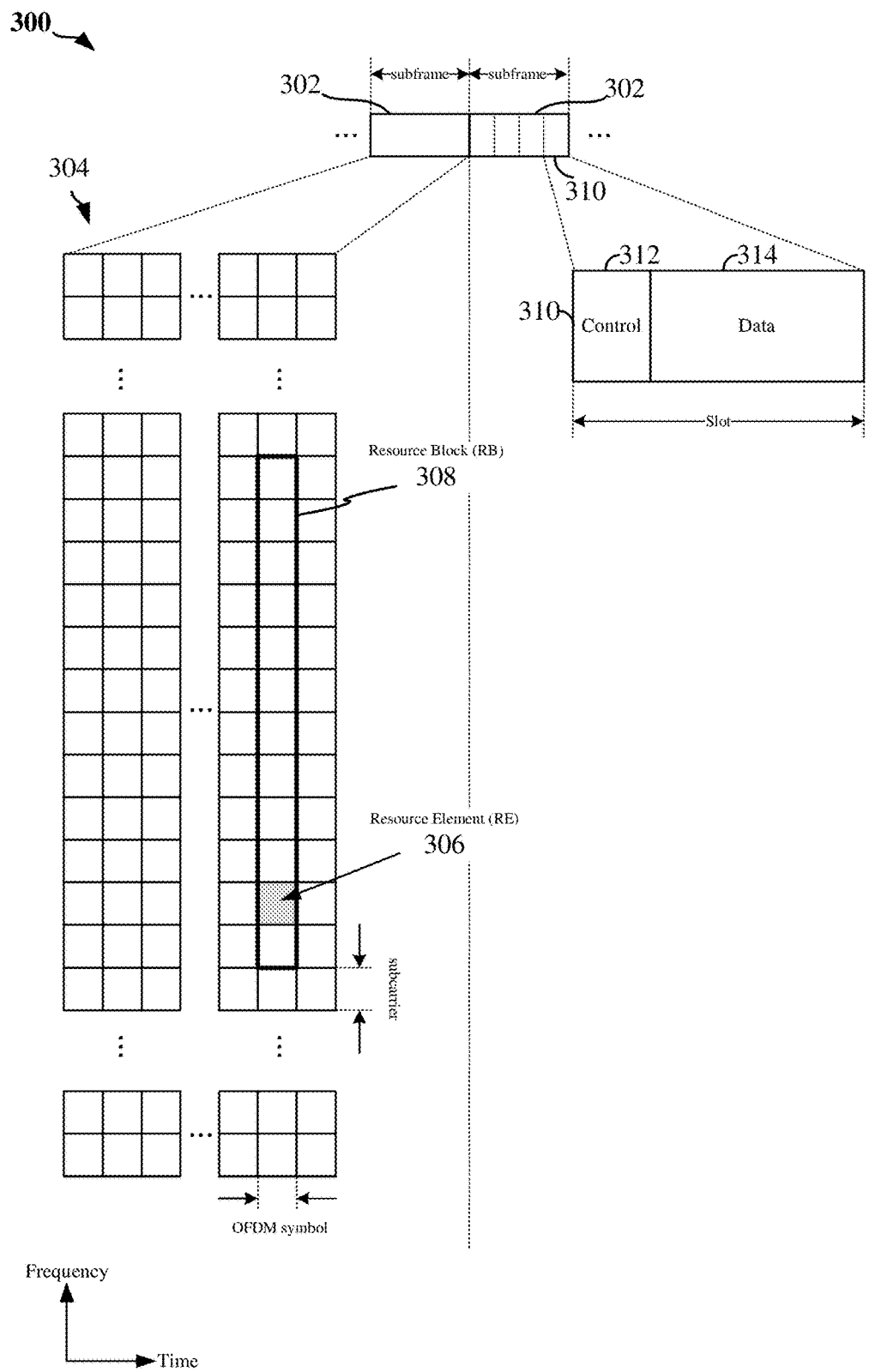
FIG. 3 is a schematic illustration of an organization of wireless resources in an air interface utilizing orthogonal frequency divisional multiplexing (OFDM).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS) a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity 108) may allocate one or more REs 306 (e.g., within a control region 312) to carry DL control information 114 including one or more DL control channels, such as a PBCH; a PSS; a SSS; a physical control format indicator channel (PCFICH); a physical hybrid automatic repeat request (HARQ) indicator channel (PHICH); and/or a physical downlink control channel (PDCCH), etc., to one or more scheduled entities 106. The PCFICH provides information to assist a receiving device in receiving and decoding the PDCCH. The PDCCH carries downlink control information (DCI) including but not limited to power control commands, scheduling information, a grant, and/or an assignment of REs for DL and UL transmissions. The PHICH carries HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission, the transmitting device (e.g., the scheduled entity 106) may utilize one or more REs 306 to carry UL control information 118 including one or more UL control channels, such as a physical uplink control channel (PUCCH), to the scheduling entity 108. UL control information may include a variety of packet types and categories, including pilots, reference signals, and information configured to enable or assist in decoding uplink data transmissions. In some examples, the control information 118 may include a scheduling request (SR), i.e., request for the scheduling entity 108 to schedule uplink transmissions. Here, in response to the SR transmitted on the control channel, the scheduling entity 108 may transmit downlink control information 114 that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry system information blocks (SIBs), carrying information that may enable access to a given cell.

The channels or carriers described above and illustrated in FIGS. 1 and 3 are not necessarily all the channels or carriers that may be utilized between a scheduling entity 108 and scheduled entities 106, and those of ordinary skill in the art will recognize that other channels or carriers may be utilized in addition to those illustrated, such as other traffic, control, and feedback channels.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

Certain networks may be adapted to implement or support URLLC, which may also be referred to as mission-critical communication. In the context of URLLC, reliability refers to the probability of success of transmitting a given number of bytes within 1 ms under a given channel quality. Ultra-reliable refers to a high target reliability, e.g., a packet success rate greater than 99.999%. Latency refers to the time it takes to successfully deliver an application layer packet or message. Low-latency refers to a low target latency, e.g., 1 ms or even 0.5 ms (in some examples, a target for eMBB may be 4 ms).

In the radio access network 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

In various aspects of the disclosure, a radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

Examples of Transmissions in a Multiple Access Network

According to an aspect of the present disclosure, slots may take at least two general forms, referred to herein as UL-centric slots and DL-centric slots. Here, a DL-centric slots is a slot where a majority of its time is used for communication in the downlink direction, and an UL-centric slot is a slot where a majority of its time is used for communication in the uplink direction. In a typical cell deployment, there may be an asymmetry between downlink traffic and uplink traffic. In general, a network has a greater amount of downlink traffic, and accordingly, a greater number of DL-centric slots may appear. Furthermore, even while this imbalance may be predictable, the actual ratio between UL-centric slots and DL-centric slots may not be predictable, and may vary over time. In one example, the ratio may be three DL-centric slots to one UL-centric slot for a certain cycle. However, other ratios are possible.

This combination of an imbalance, and unpredictability of its exact measure, can cause issues in conventional TDD frame/subframe/slot structures. Specifically, if a UE or scheduled entity has data that it wishes to transmit over the uplink, the UE must wait for an uplink transmission opportunity. With this structure, the time when such an uplink transmission opportunity may occur can vary, and can be unpredictable. In many cases, the time may be quite long, resulting in significant latency. This latency can be particularly problematic when the information that the UE wishes to transmit over the uplink is control feedback, which can in many cases be time-sensitive or mission-critical.

This unpredictable latency can be at least partially alleviated by utilizing a slot structure that presents reasonable uplink transmission opportunities in every slot. Accordingly, in some aspects of the present disclosure, TDD slots may be structured as self-contained slots.

Figure 4:
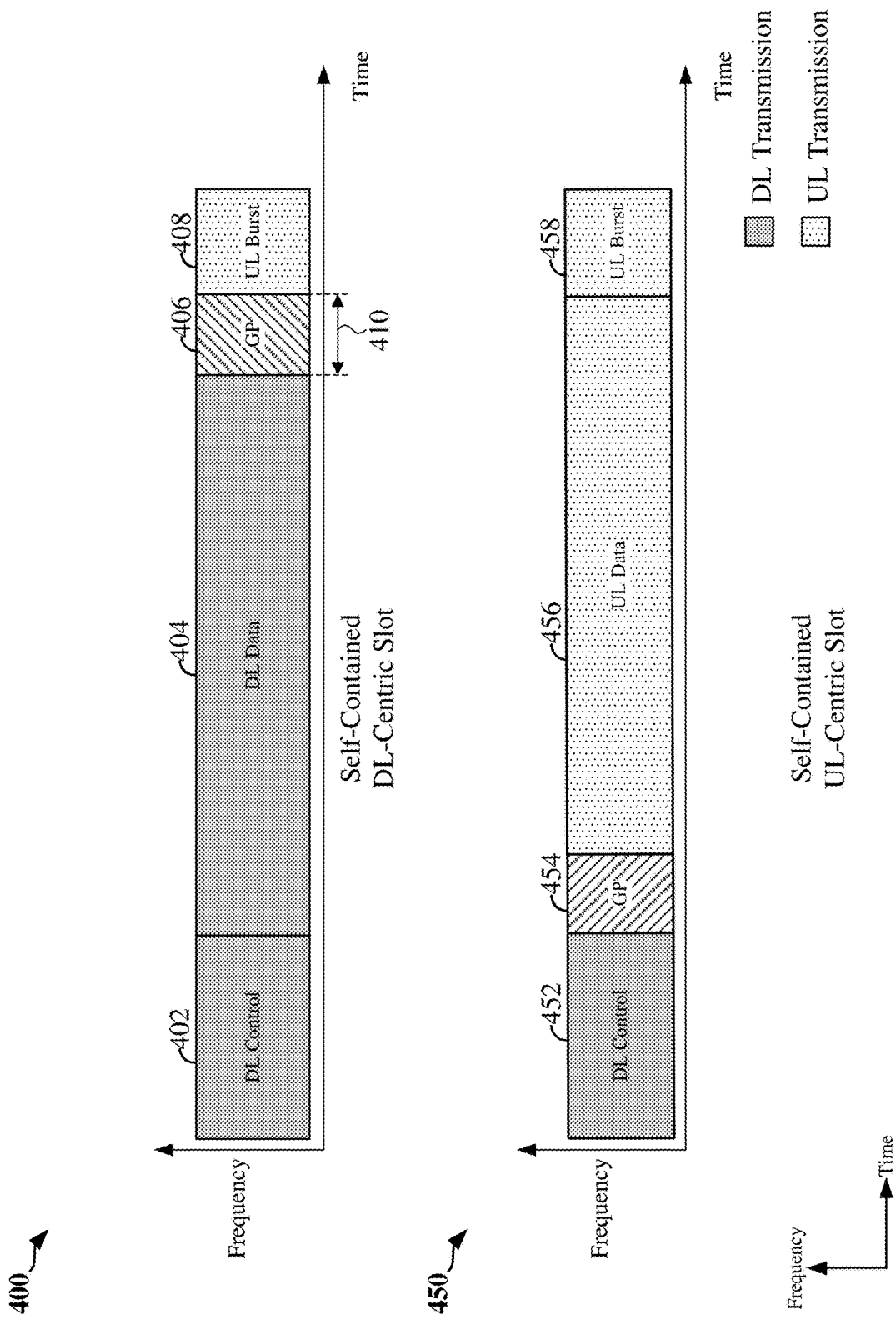
FIG. 4 is a schematic illustration of exemplary self-contained slots according to some aspects of the disclosure.

According to an aspect of the disclosure, one or more slots may be structured as self-contained slots. For example, FIG. 4 illustrates two example structures of self-contained slots 400 and 450. The self-contained slots 400 and/or 450 may be used, in some examples, in place of the slot 310 described above and illustrated in FIG. 3.

Broadly, a self-contained slot is one in which the scheduling, the data transmission, and the data acknowledgment (feedback) are grouped together into a single self-contained unit or slot, and may be independent of any other slots. For example, referring to the DL-centric slot 400, all of the data in the DL data portion 404 may be scheduled utilizing scheduling information or grants in the DL control region 402; and further, all of the data in the data portion 404 may be acknowledged (or negatively acknowledged) in the UL burst 408 (UL control). Similarly, for the uplink-centric slot 450, all of the data in the UL data portion 456 may be scheduled utilizing scheduling information or grants in the DL control region 452.

In the illustrated example, a DL-centric slot 400 may be a transmitter-scheduled slot. The nomenclature DL-centric generally refers to a structure wherein more resources are allocated for transmissions in the DL direction (e.g., transmissions from the scheduling entity 108 to the scheduled entity 106). Similarly, an UL-centric slot 450 may be a receiver-scheduled slot, wherein more resources are allocated for transmissions in the UL direction (e.g., transmissions from the scheduled entity 106 to the scheduling entity 108).

Each slot, such as the self-contained slots 400 and 450, may include transmit (Tx) and receive (Rx) portions. For example, in the DL-centric slot 400, the scheduling entity 108 first has an opportunity to transmit control information, e.g., on a PDCCH, in a DL control region 402, and then an opportunity to transmit DL user data or traffic, e.g., on a PDSCH in a DL data portion 404. Following a guard period (GP) region 406 having a suitable duration 410, the scheduling entity 108 has an opportunity to receive UL data and/or UL feedback including any UL scheduling requests, CSF, a HARQ ACK/NACK, etc., in an UL burst 408 from other entities using the carrier. Here, a slot such as the DL-centric slot 400 may be referred to as a self-contained slot when all of the data carried in the DL data portion 404 is scheduled in the DL control region 402 of the same slot; and further, when all of the data carried in the DL data portion 404 is acknowledged (or at least has an opportunity to be acknowledged) in the UL burst 408 of the same slot. In this way, each self-contained slot may be considered a self-contained entity, not necessarily requiring any other slot to complete a scheduling-transmission-acknowledgment cycle for any given packet.

The GP region 406 may be included to accommodate variability in UL and DL timing. For example, latencies due to radio frequency (RF) antenna direction switching (e.g., from DL to UL) and transmission path latencies may cause the scheduled entity 106 to transmit early on the UL to match DL timing. Such early transmission may interfere with symbols received from the scheduling entity 108. Accordingly, the GP region 406 may allow an amount of time after the DL data portion 404 to prevent interference, where the GP region 406 provides an appropriate amount of time for the scheduling entity 108 to switch its RF antenna direction, an appropriate amount of time for the over-the-air (OTA) transmission, and an appropriate amount of time for ACK processing by the scheduled entity.

Similarly, the UL-centric slot 450 may be configured as a self-contained slot. The UL-centric slot 450 is substantially similar to the DL-centric slot 400, including a guard period 454, an UL data portion 456, and an UL burst region 458.

The slot structure illustrated in slots 400 and 450 is merely one example of self-contained slots. Other examples may include a common DL portion at the beginning of every slot, and a common UL portion at the end of every slot, with various differences in the structure of the slot between these respective portions. Other examples still may be provided within the scope of the present disclosure.

In the context of a multiple access network, channel resources are generally scheduled, and each entity is synchronous in time. That is, each node utilizing the network coordinates its usage of the resources such that transmissions are only made during the allocated portion of the frame, and the time of each allocated portion is synchronized among the different nodes or network devices. One node acts as a scheduling entity, and one or more nodes may be subordinate entities. The scheduling entity may be a base station or access point, or a UE in a device-to-device (D2D), P2P, and/or mesh network. The scheduling entity manages the resources on the carrier and assigns resources to other users of the channel or carrier, including subordinate or scheduled entities, such as one or more UEs in a cellular network.

Each slot is divided into transmit (Tx) and receive (Rx) portions. In the DL-centric slot 400, the scheduling entity first has an opportunity to transmit control information in the DL control region 402, and then an opportunity to transmit data in the DL data portion 404. The Tx portions (DL control region 402 and DL data portion 404) carry DL bursts in this case. Following a guard period (GP) region 406, the scheduling entity has an opportunity to receive an ACK/NACK signal or feedback in the UL burst 408 from other entities using the carrier. The ACK/NACK signal or feedback may be carried in an UL burst 408. This frame structure is downlink-centric, as more resources are allocated for transmissions in the downlink direction (e.g., transmissions from the scheduling entity).

In one example, the DL control region 402 may be used to transmit a physical downlink control channel (PDCCH), and the DL data portion 404 may be used to transmit a DL data payload or user data. Following the GP region 406, the scheduling entity may receive an ACK signal (or a NACK signal) from the scheduled entity or subordinate entity during the UL burst 408 to indicate whether the data payload was successfully received. The GP region 406 may be scheduled to accommodate variability in UL and DL timing. For example, latencies due to RF antenna and/or circuitry direction switching (e.g., from DL to UL) and transmission path latencies may cause the subordinate entity to transmit early on the UL to match DL timing. Such early transmission may interfere with symbols received from the scheduling entity. Accordingly, the GP region 406 may allow an amount of time after the DL data portion 404 to prevent or reduce interference, where the GP region 406 may provide an appropriate amount of time for the scheduling entity to switch its RF antenna/circuitry direction, for the over-the-air (OTA) transmission time, and time for ACK processing by the subordinate entity. Accordingly, the GP region 406 may provide an appropriate amount of time for the subordinate entity to switch its RF antenna/circuitry direction (e.g., from DL to UL), to process the data payload, and for the over-the-air (OTA) transmission time. The duration of the GP region 406 may be configured in terms of symbol periods. For example, the GP region 406 may have a duration of one symbol period or multiple symbol periods. This frame structure is downlink-centric, as more resources are allocated for transmissions in the downlink direction (e.g., transmissions from the scheduling entity).

In the UL-centric slot 450, the subordinate entity first has an opportunity to receive control information in the DL control region 452. Following a GP portion 454, the subordinate entity has an opportunity to transmit data in the UL data portion 456. The subordinate entity subsequently may have an opportunity to transmit an ACK/NACK signal in the UL burst region 458. This frame structure is uplink-centric, as more resources are allocated for transmissions in the uplink direction (e.g., transmissions from the subordinate entity). In some aspects of the disclosure, the GP portion may be optional.

Figure 5:
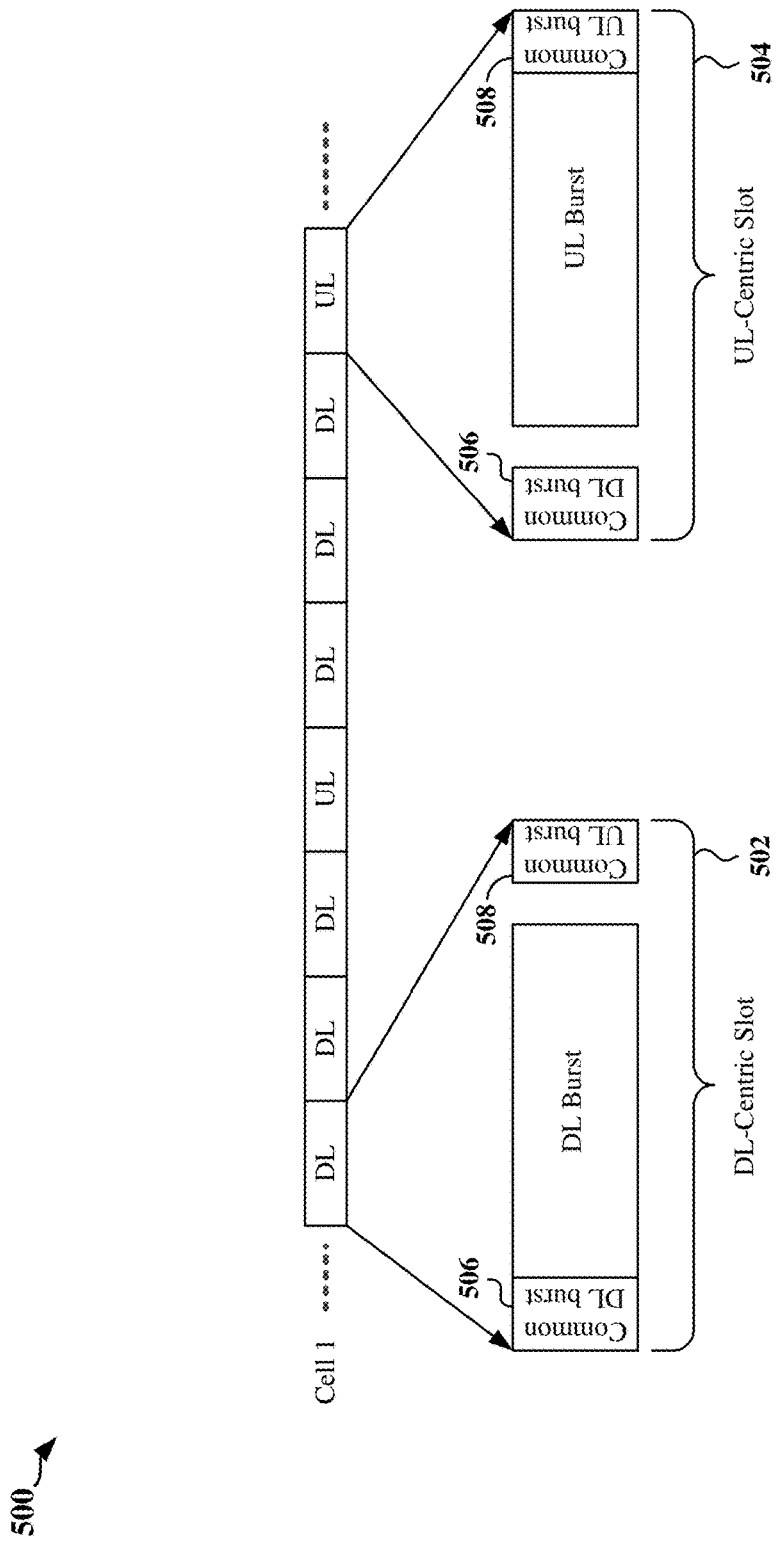
FIG. 5 is a diagram illustrating a common downlink burst and a common uplink burst included in each of a downlink-centric slot and an uplink-centric slot in accordance with certain aspects of the disclosure.

FIG. 5 illustrates an example 500 of common DL bursts and common UL bursts as they may appear in each of a DL-centric slot 502 and an UL-centric slot 504. In the illustrated examples, the common DL bursts 506 occur at the beginning of each slot, and the common UL bursts 508 occur at the end of each slot. However, this is not necessarily the case, and within the scope of the present disclosure, such common UL burst and common DL burst may appear anywhere within each respective slot. For example, some networking technologies a slot includes two or more slots, and common UL bursts and common DL bursts may be provided in each slot.

In certain aspects of the disclosure, all common DL bursts 506 within any given slot (whether an UL-centric slot or a DL-centric slot) may have the same structure, and/or all common UL bursts 508 within any given slot (whether an UL-centric slot or a DL-centric slot) may have the same structure. While these common bursts may carry any suitable information, in some examples, the common DL burst may be utilized to carry control information transmitted by the scheduling entity, including but not limited to scheduling information for either the UL or DL (or both); or, in multi-interlace or non-self-contained slots, physical layer acknowledgment (ACK) transmissions. For example, the common DL bursts 506 may include the DL control regions 402 and 452 of FIG. 4. Further, the common UL burst may be utilized to carry UL control information transmitted by the UE or subordinate entity, including but not limited to a sounding reference signal (SRS), a physical layer ACK or NACK, a scheduling request (SR), channel quality information (CQI), etc.

As with the self-contained slots described above, by utilizing these common UL and DL bursts, latency may be reduced for mission-critical packets such as control information and feedback, to the duration of, for example, a single slot. However, according to various aspects of the present disclosure, the possibility for this latency or delay to be controlled allows different delays or latencies to be provided. That is, by virtue of the presence of the common DL burst 506 and common UL burst 508 in every slot, the subordinate entity and scheduling entity may be enabled to send the control information carried on these common bursts with a configurable delay, which may be independent of the UL/DL ratio, or the nature of the particular slot currently occupying the channel (either DL-centric or UL-centric). Furthermore, in further aspects of the disclosure, UEs or subordinate entities with different delays may be multiplexed onto the channel, and may share these resources while still maintaining control over their respective delays.

Common PUCCH Design with Flexible Numbers of Symbols

Uplink slots my carry control information that may be transmitted in PUCCH. At least 14 symbols may be needed to support a link budget that is similar to the link budget of an LTE access network, for example. According to certain aspects disclosed herein, PUCCH may be designed to support flexible symbol configuration. Certain aspects of the disclosure provide a common slot design with a flexible number of symbols.

Figure 6:
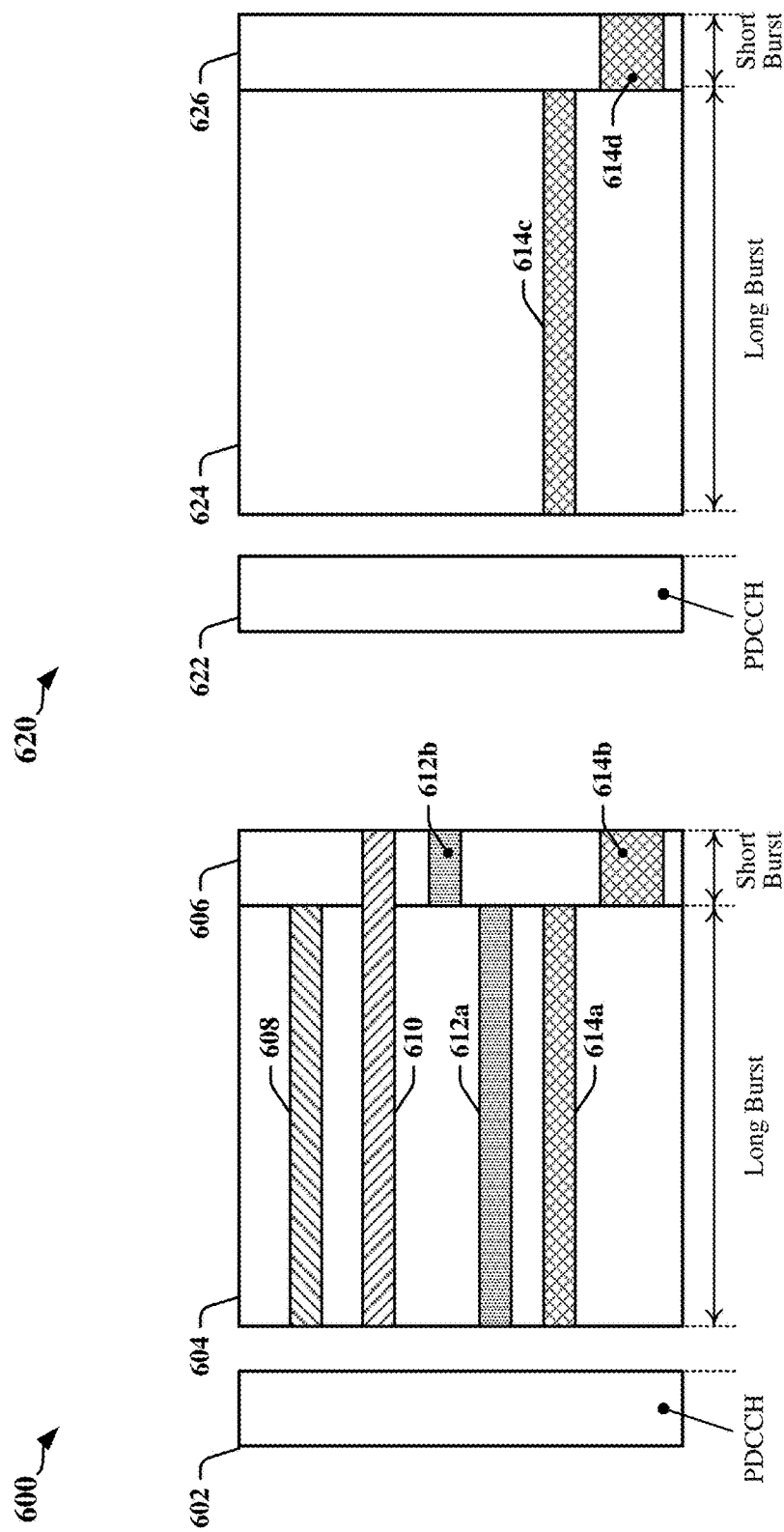
FIGS. 6 and 7 illustrate examples of uplink slots that may be configured according to some aspects of the disclosure to carry control information in NR access networks.
Figure 7:
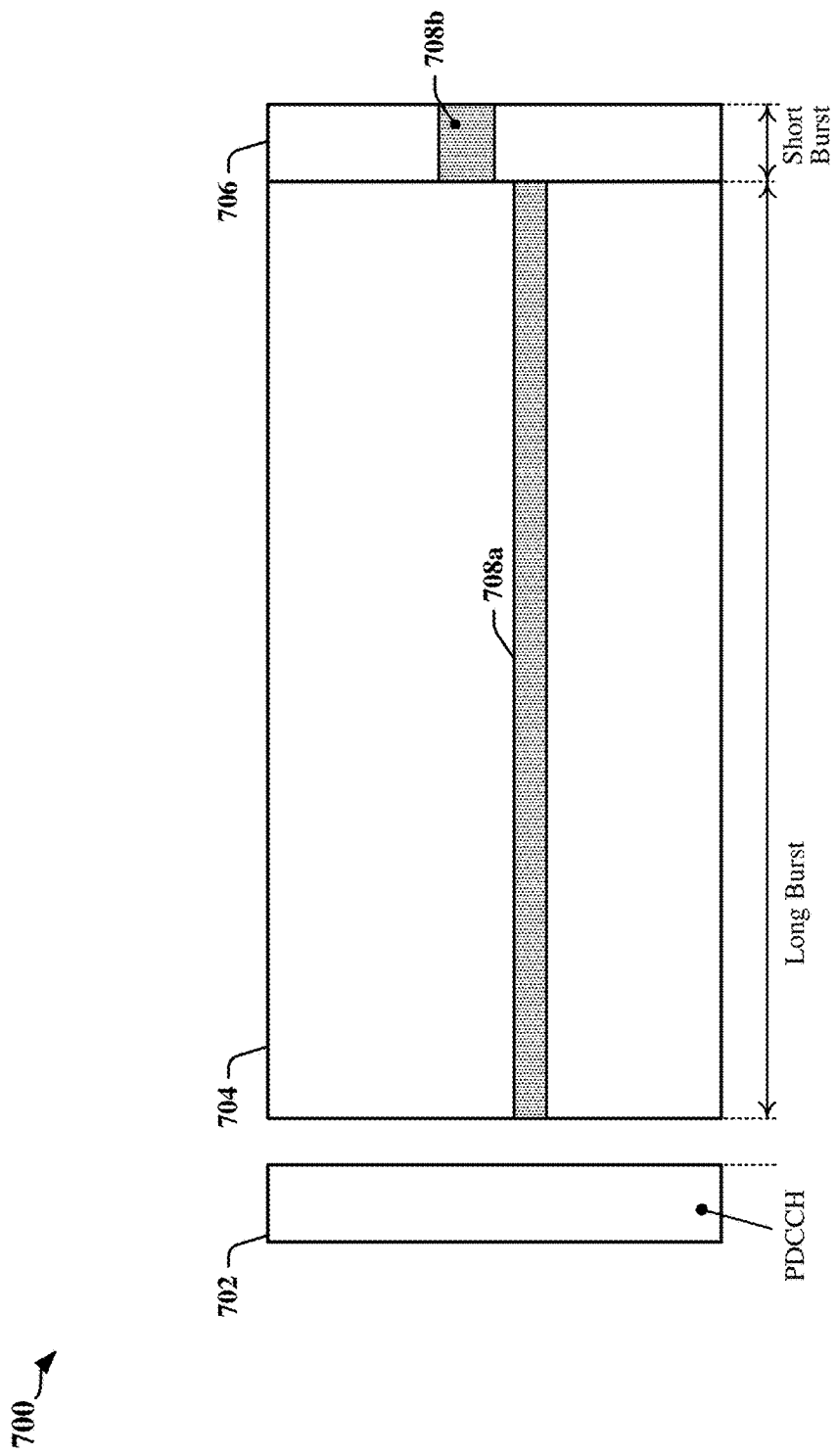

FIGS. 6 and 7 illustrate examples of uplink slots 600, 620, 700 that may be configured to carry PUCCH in a NR access network. In the example, URLLC control with very short duration is excluded. In FIG. 6, the slots 600, 620 have a 1-slot duration and include respective downlink portions 602, 622 that may be used to provide scheduling information, for example. Each slot 600, 620 includes a long burst 604, 624 and a short burst 606, 626. A first-transmitted slot 600 may immediately precede a second-transmitted slot 620. The first-transmitted slot 600 may carry a first PUCCH 608 that is transmitted solely in the long burst 604. In one example, the first PUCCH 608 may include 11 symbols. In other examples, different numbers of symbols may be provided for PUCCH 608 transmitted solely in the long burst 604. A second PUCCH 610 is transmitted in both the long burst 604 and the short burst 606 using the same resource blocks (RBs) in both the long burst 604 and the short burst 606. In one example, the second PUCCH 610 may include 12 symbols. In other examples, different numbers of symbols may be provided for PUCCH 610 that is transmitted in both the long burst 604 and the short burst 606 using the same RBs. A resource block may identify the subcarriers used for transmitting a channel. A third PUCCH 612a, 612b is transmitted in both the long burst 604 and the short burst 606, using different resources in the long burst 604 and the short burst 606, even where the PUCCH 612a carried in the long burst 604 and the PUCCH 612b carried in the short burst 606 are transmitted by the same UE. In one example, the PUCCH 612b transmitted in the short burst 606 may be bundled with additional uplink short-burst PUCCH, and may have (11+1) symbols or 11+(2×½) symbols. In other examples, different numbers of symbols may be provided for PUCCH 612a, 612b that is transmitted in both the long burst 604 and the short burst 606 using different resources in the long burst 604 and the short burst 606.

A fourth PUCCH is transmitted in both the first-transmitted slot 600 and the second-transmitted slot 620. The fourth PUCCH may include PUCCH portions 614a, 614c transmitted in the long bursts 604 and 624. Optionally, PUCCH portions 614b and/or 614d may be transmitted in the short burst 606 and/or 626. In one example, the PUCCH 614a, 614b, 614c, 614d may include 22 symbols, 24 symbols, or 22+2 symbols over the two slots. In other examples, different numbers of symbols may be provided for PUCCH 614a, 614c transmitted in the long bursts 604 and 624 of two slots. The slots 600, 620 are separated by a downlink portion 622 that may require a first guard period or gap be provided between the short burst 606 of the first-transmitted slot 600 and the downlink portion 622 of the first-transmitted slot 600, and a second guard period or gap between the downlink portion 622 of the first-transmitted slot 600 and the long burst 624 of the second-transmitted slot 620. FIG. 7 illustrates an example of an uplink slot 700 that has a 2-slot duration with no downlink portion between slots. That is, a single long burst 704 is transmitted followed by a short burst 706. In this example, a PUCCH portion 708a is transmitted across two slots and an optional PUCCH portion 708b is optionally transmitted in the short burst 706. In one example, two or more aggregated slots may provide PUCCH 708a, 708b with 25, 26, or 25+1 symbols over the two slots. In other examples, different numbers of symbols may be provided for PUCCH transmitted in a slot 700 that includes two or more aggregated slots.

The number of PDCCH symbols may be semi-statically configured by the cell and it may not be possible to dynamically change the number of PDCCH symbols. The PDCCH examples depicted in FIGS. 6 and 7 involve a relatively small number of symbols transmitted in a single band, e.g., one PDCCH symbol per slot. In another example, the number of PDCCH symbols may be configured differently, e.g., 2 symbols per slot. Consequently, the number of PUCCH symbols in different settings may also be different from above. For example, a long burst only transmission may have 10 symbols. And a transmission of PUCCH with extension to short burst may have 11 symbols and so on. Certain aspects of the disclosure provide a common slot design with different number of PDCCH transmission. In some instances, closed-loop feedback may be used or needed to select best frequencies for transmitting PUCCH as illustrated in FIGS. 6 and 7.

Figure 8:
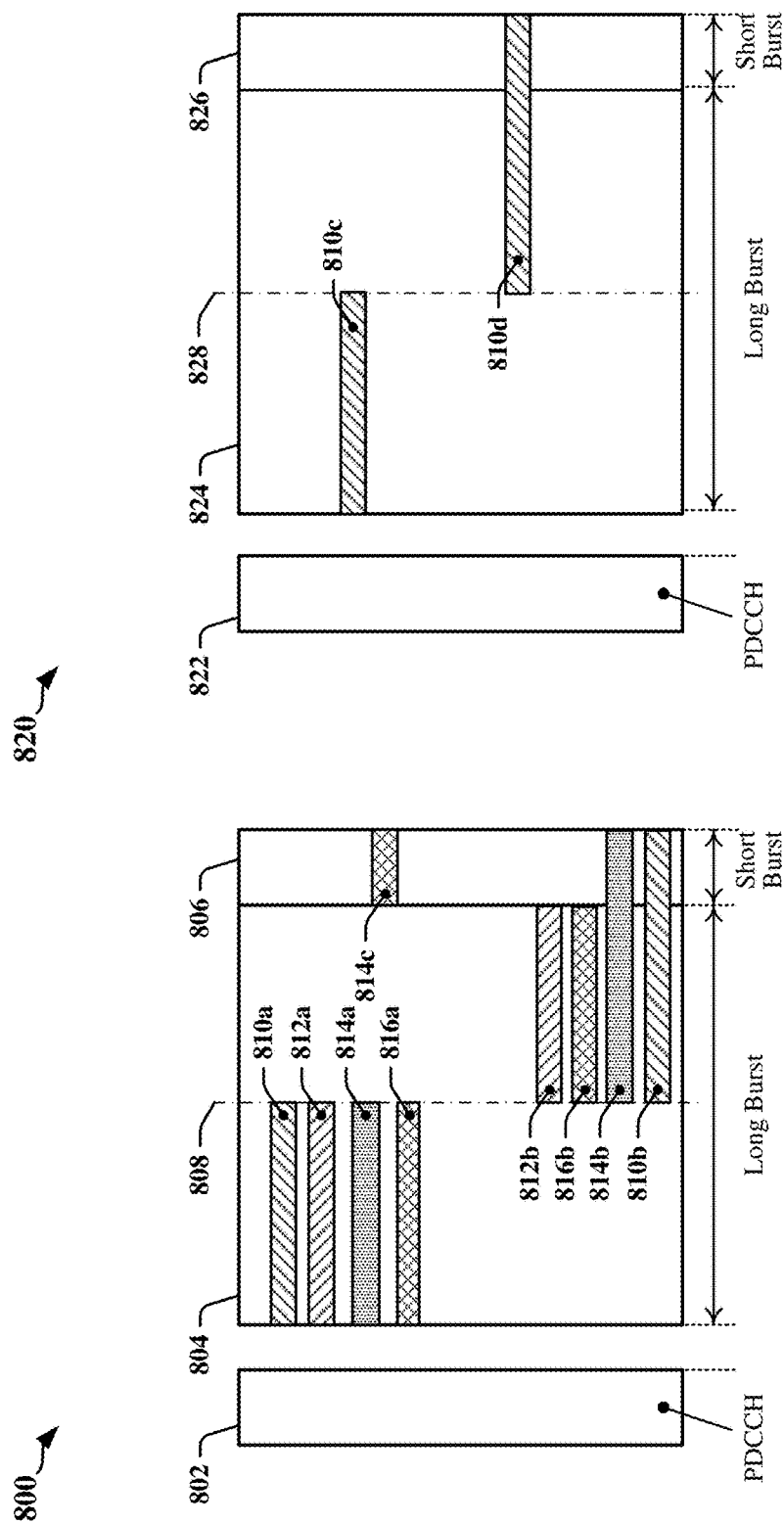
FIGS. 8 and 9 illustrate examples of uplink slots that may be configured according to some aspects of the disclosure to carry control information in NR access networks in which half-slot frequency hopping is implemented.
Figure 9:
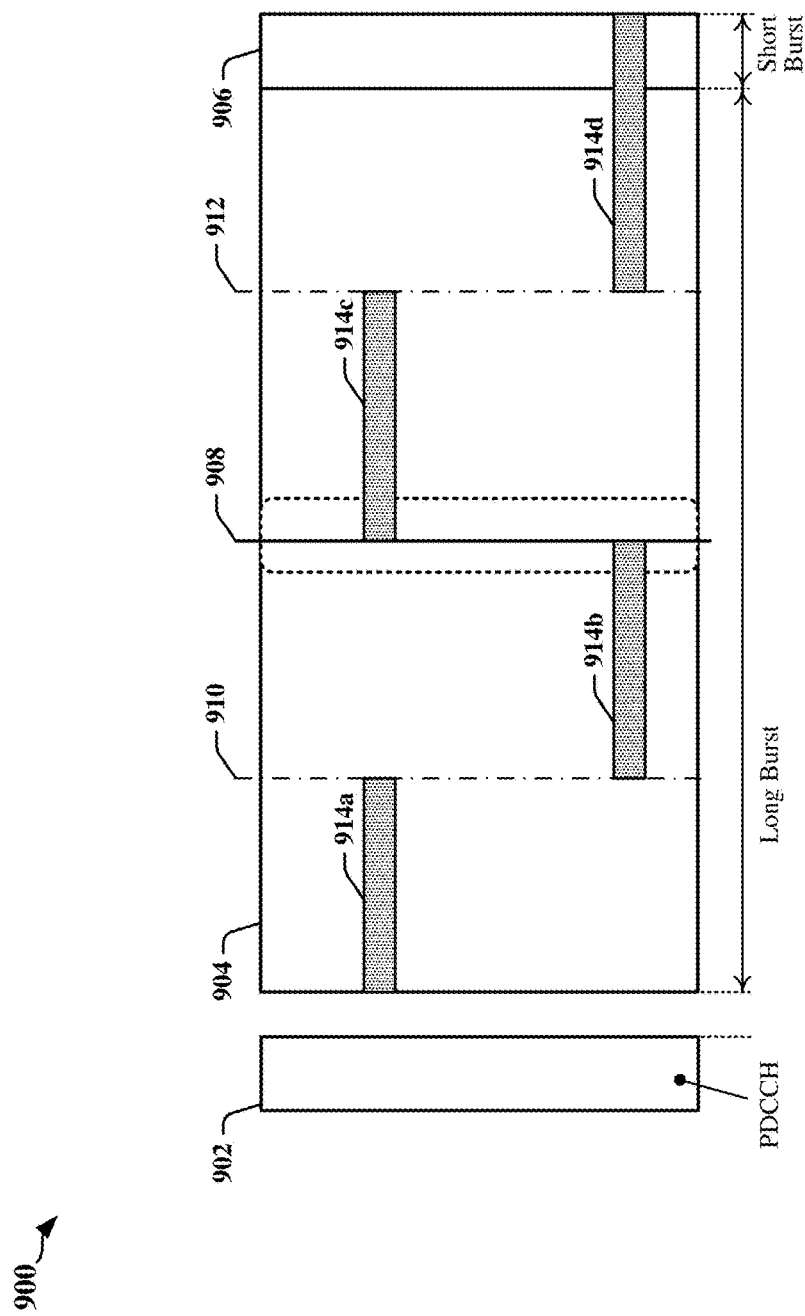

Certain aspects of the disclosure provide a common slot design with a flexible number of PUCCH symbols when half-slot frequency hopping is implemented. Frequency hopping can introduce frequency diversity for PUCCH. FIGS. 8 and 9 illustrate examples of uplink slots 800, 820, 900 that may be configured to carry PUCCH in a NR access network in which half-slot frequency hopping is implemented. The PDCCH examples of FIGS. 8 and 9 may be based on corresponding PDCCH transmissions in FIGS. 6 and 7. For example, the slots 800, 820 have a 1-slot duration and include respective downlink portions 802, 822 that may be used to provide scheduling information. Each slot 800, 820 includes a long burst 804, 824 and a short burst 806, 826. A first-transmitted slot 800 may immediately precede a second-transmitted slot 820. Here, intra-slot frequency hopping is implemented. Frequency hopping may be performed at a fixed point 808, 828 in each slot 800, 820. The frequency-hopping point 808, 828 (at which frequency hopping is performed) may be constant for all slots 800, 820.

A first PUCCH 810a, 810b, 810c, 810d may be transmitted in first resources in the long burst 804 of the first-transmitted slot 800 before the frequency-hopping point 808, in second resources in the long burst 804 and the short burst 806 of the first-transmitted slot 800 after the frequency-hopping point 808, in third resources in the long burst 824 of the second-transmitted slot 820 before the frequency-hopping point 828, and in fourth resources in the long burst 824 and the short burst 826 of the second-transmitted slot 820 after the frequency-hopping point 828. A second PUCCH 812a, 812b is transmitted in first resources in the long burst 804 before the frequency-hopping point 808 and in second resources in the long burst 804 after the frequency-hopping point 808. A third PUCCH 814a, 814b is transmitted in first resources in the long burst 804 before the frequency-hopping point 808 and in second resources in the long burst 804 and the short burst 806 after the frequency-hopping point 808. A fourth PUCCH 816a, 816b, 816c is transmitted in first resources in the long burst 804 before the frequency-hopping point 808, in second resources in the long burst 804 after the frequency-hopping point 808 and in third resources in the short burst 806.

FIG. 9 illustrates an example of an uplink slot 900 that has a 2-slot duration with no downlink portion between slots. That is, a single long burst 904 is transmitted followed by a short burst 906. In this example, intra-slot frequency hopping and/or cross slot frequency hopping may be implemented. In the illustrated example, a first PUCCH portion 914a is transmitted in the long burst 904 before the frequency-hopping point 910 in the first slot, a second PUCCH portion 914b is transmitted in the long burst 904 after the frequency-hopping point 910 in the first slot and before the cross-slot frequency-hopping point 908, a third PUCCH portion 914c is transmitted in the long burst 904 after e cross-slot frequency-hopping point 908 and before the frequency-hopping point 912 in the second slot, and a fourth PUCCH portion 914d is transmitted in the long burst 904 and short burst 906 after the frequency-hopping point 912 in the second slot.

Figure 10:
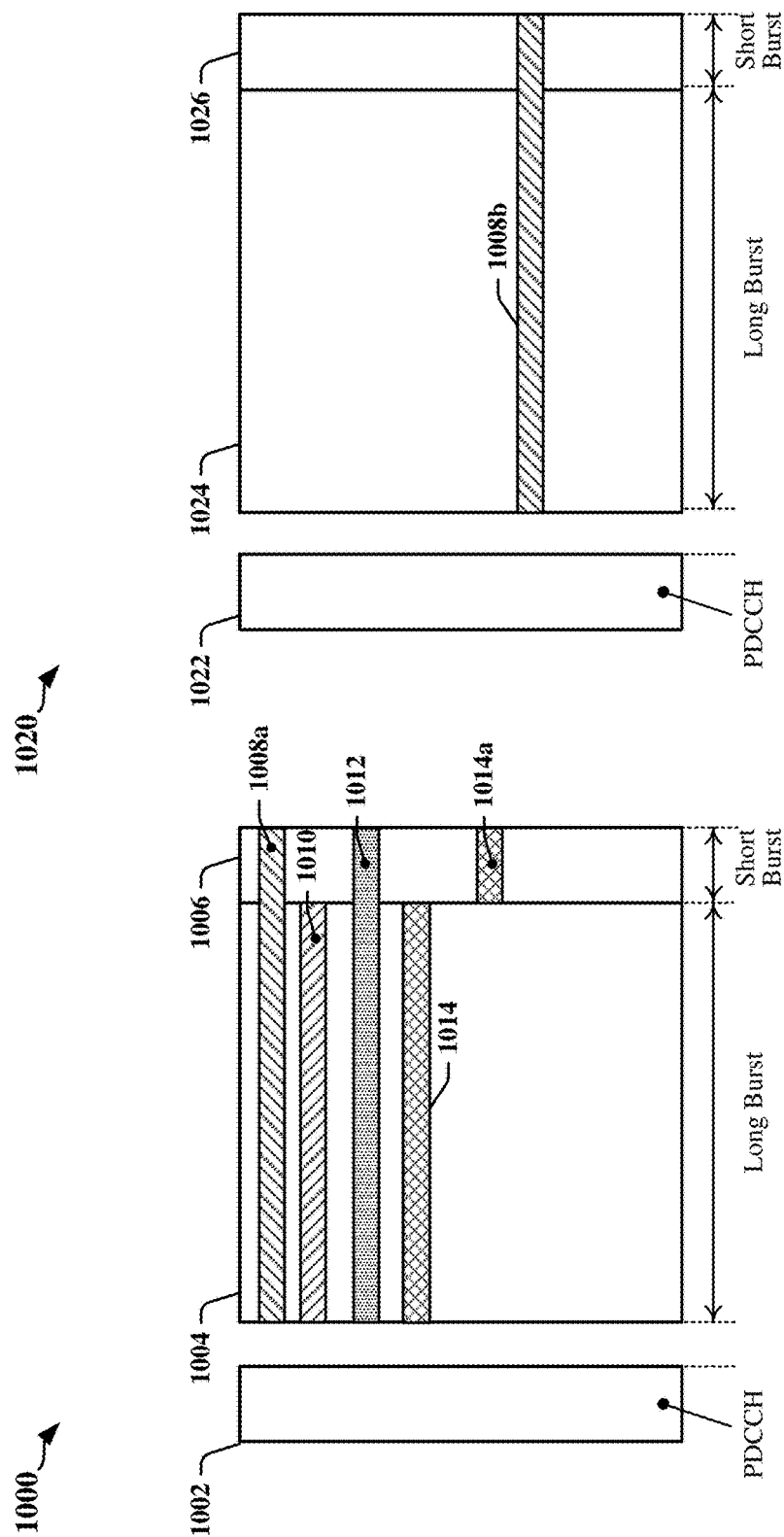
FIGS. 10 and 11 illustrate examples of uplink slots that may be configured according to some aspects of the disclosure to carry control information in NR access networks in which inter-slot frequency hopping is implemented.
Figure 11:
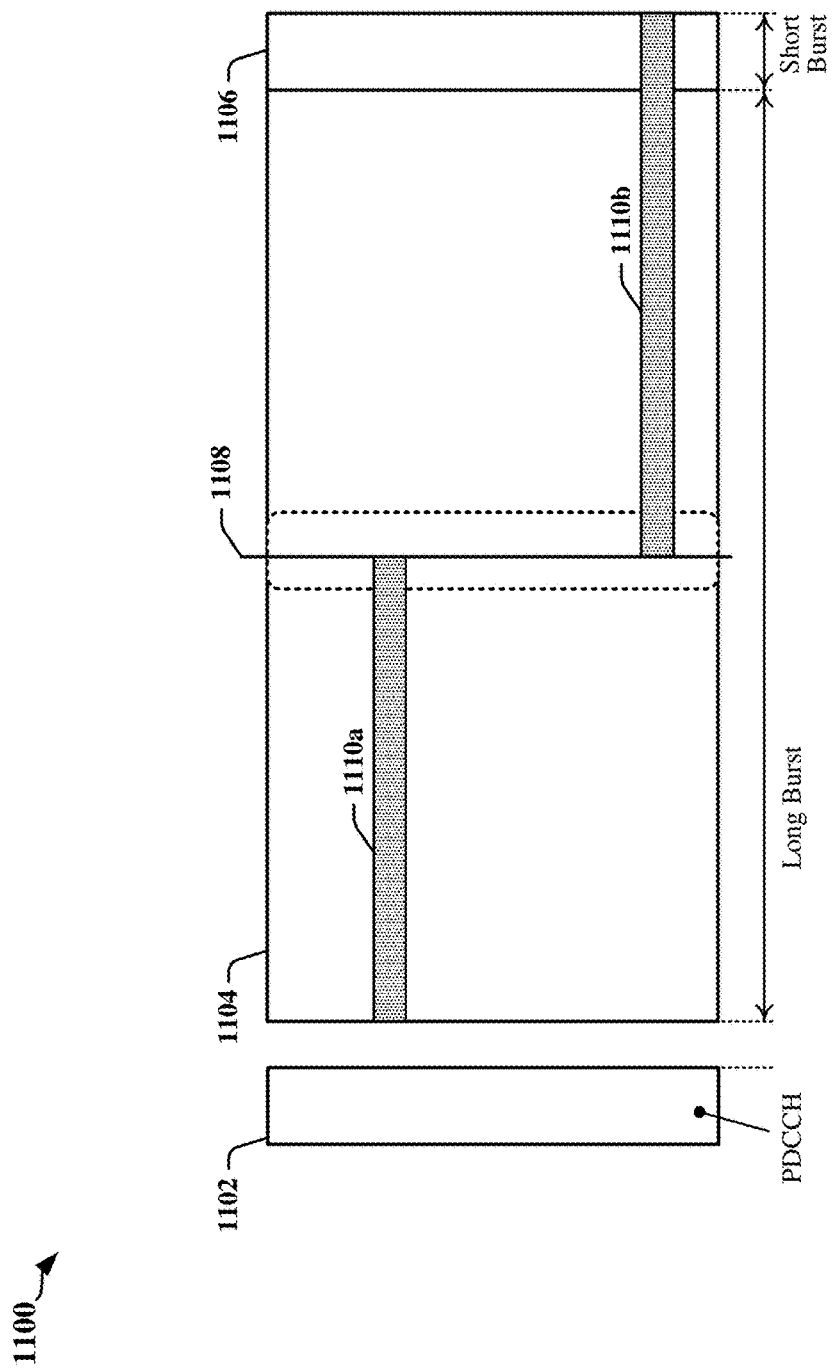

Certain aspects of the disclosure provide a common slot design with a flexible number of PDCCH symbols when inter-slot frequency hopping is implemented. FIGS. 10 and 11 illustrate examples of uplink slots 1000, 1020, 1100 that may be configured to carry PUCCH in a NR access network in which inter-slot frequency hopping is implemented. The PDCCH examples of FIGS. 10 and 11 may be based on corresponding PDCCH transmissions in FIGS. 6 and 7. For example, the slots 1000, 1020 have a 1-slot duration and include respective downlink portions 1002, 1022 that may be used to provide scheduling information. Each slot 1000, 1020 includes a long burst 1004, 1024 and a short burst 1006, 1026. A first-transmitted slot 1000 may immediately precede a second-transmitted slot 1020. Here, inter-slot frequency hopping is implemented, whereby frequency hopping may be performed at a fixed point, which may be located between slots 1000 and 1020 in each slot 1000, 1020 and/or at a point 1108 between slots. For example, the inter-slot frequency hopping is performed at each slot boundary between 1008a and 1008b.

For single-slot slots 1000, 1020, the resource used for PDCCH may change between slot 1000, 1020. For example, the resources assigned for PDDCH 1108a, 1008b that is provided in the two consecutive slots 1000, 1020 may change between slots. FIG. 11 illustrates an example of an uplink slot 1100 that has a 2-slot duration with no downlink portion between slots. That is, a single long burst 1104 is transmitted followed by a short burst 1106. In this example, cross slot frequency hopping may be implemented. In the illustrated example, a first PUCCH portion 1110a is transmitted in the long burst 1104 in the first slot, and a second PUCCH portion 1114b is transmitted in the long burst 1104 in the second slot. The inter-slot frequency hopping is performed at each slot boundary, and therefore the first PUCCH portion 1114a may have a different number of symbols than the second PUCCH portion 1114b.

In these examples, the point 1108 for frequency hopping is fixed and may be determined at the interface between slots for both the single-slot slots 1000, 1020 and multi-slot slot 1100. That is, cross-slot frequency-hopping may be implemented to cause hopping at each slot boundary. The cross-slot frequency-hopping approach adopted in the examples of FIGS. 10 and 11 may have a lower reference signaling overhead and/or better channel quality than the intra-slot approach illustrated in FIGS. 8 and 9. The cross-slot frequency-hopping approach illustrated in FIGS. 10 and 11 may have limited frequency diversity when open-loop transmission is employed with single slot slots 1000, 1020. In some instances, a base station may select the best resource blocks using a closed-loop resource block selection technique.

Figure 12:
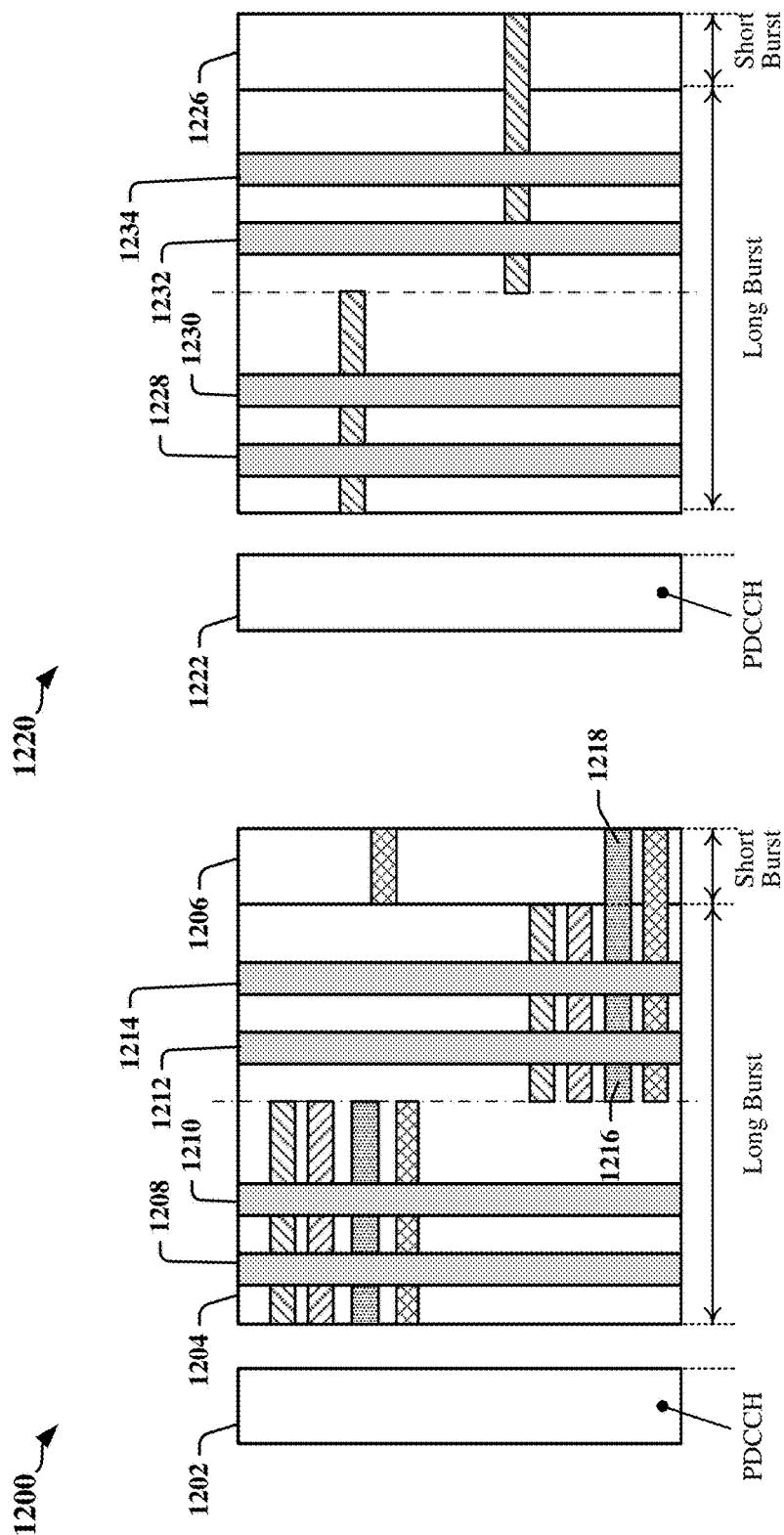
FIGS. 12 and 13 illustrate examples of uplink slots that illustrate the effect of a reference signal (RS) on control information transmitted in uplink slots configured according to some aspects of the disclosure over NR access networks.
Figure 13:
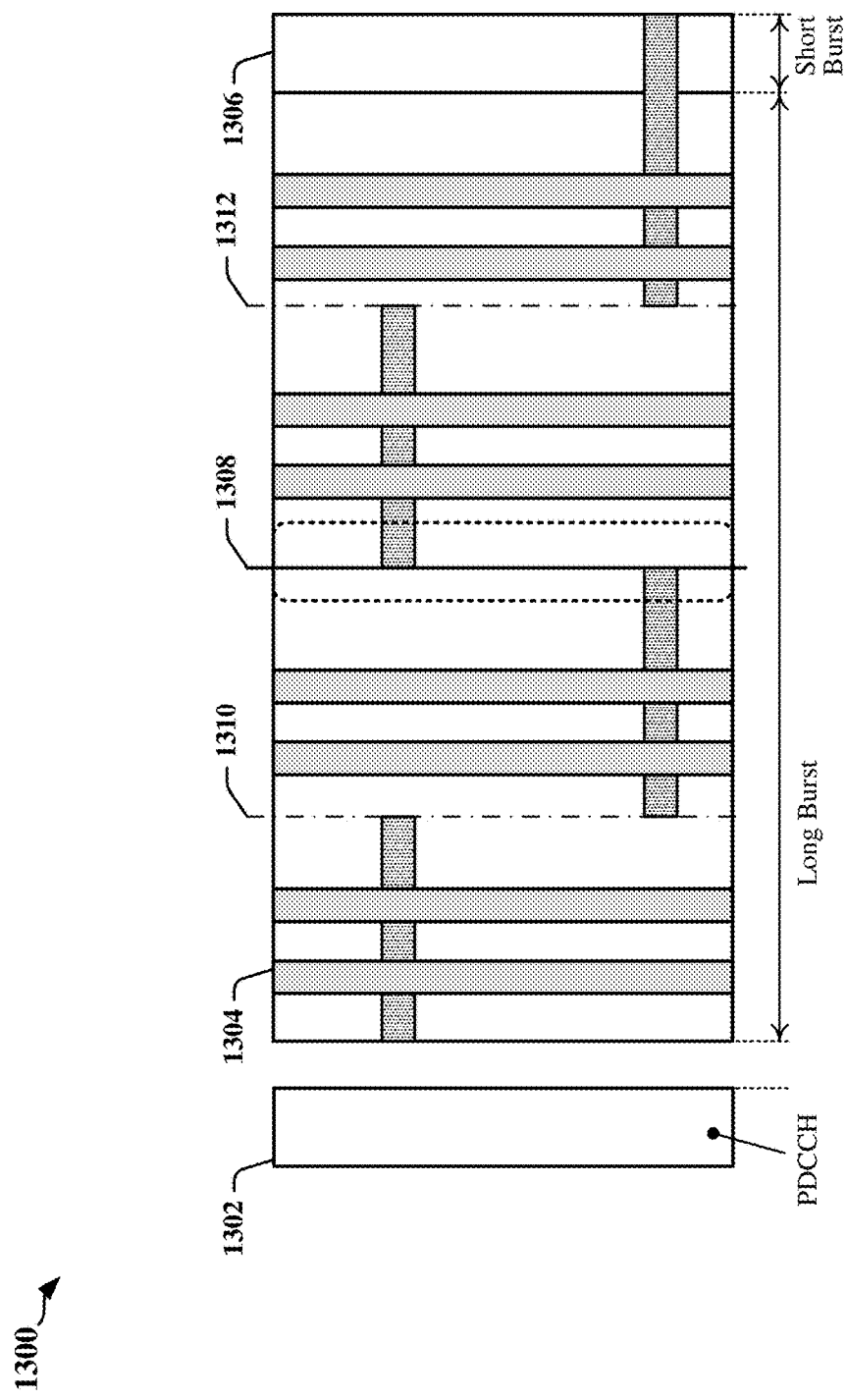

FIGS. 12 and 13 illustrate examples of uplink slots 1200, 1220, 1300 that illustrate the effect of a reference signal (RS) on PUCCH provided in accordance with certain aspects disclosed herein. The PDCCH examples of FIGS. 12 and 13 may be based on corresponding PDCCH transmissions in FIGS. 8 and 9. For example, the slots 1200, 1220 have a 1-slot duration and include respective downlink portions 1202, 1222 that may be used to provide scheduling information. Each slot 1200, 1220 includes a long burst 1204, 1224 and a short burst 1206, 1226. A first-transmitted slot 1200 may immediately precede a second-transmitted slot 1220, and intra-slot frequency hopping is implemented. Frequency hopping may be performed at a fixed point in each slot 1200, 1220. The frequency-hopping point may be constant for all slots 1200, 1220. FIG. 13 illustrates an example of an uplink slot 1300 that has a 2-slot duration with no downlink portion between slots. That is, a single long burst 1304 is transmitted followed by a short burst 1306. In this example, intra-slot frequency hopping and/or cross slot frequency hopping may be implemented.

RS locations 1208, 1210, 1212, 1214, 1228, 1230, 1232, 1234 depend only on payload size. When payload size has been fixed, the RS locations 1208, 1210, 1212, 1214, 1228, 1230, 1232, 1234 are fixed for different scenarios. RS locations 1208, 1210, 1212, 1214, 1228, 1230, 1232, 1234 are always confined within normal regular burst. For example, the RS locations 1208, 1210, 1212, 1214, 1228, 1230, 1232, 1234 may include symbols 3, 5, 8, 10, while the PDCCH symbol is symbol 0 in any slot. The RS locations 1208, 1210, 1212, 1214, 1228, 1230, 1232, 1234 identified in FIGS. 12 and 13 indicate the RS symbol index. The RS symbols may not occupy the entire bandwidth. In any PUCCH settings, the RS symbols will occupy the same band as data symbols and the band is configured by eNB.

When PUCCH is extended to include short bursts 1206, 1226, only data symbols are extended and rate matched. For small payload with CDM in the time domain, spreading factor and orthogonal covers may need to be changed. For example, the PUCCH portion 1216 includes one or more additional symbols 1218 transmitted in the short burst 1206 may necessitate changes in the spreading factor and orthogonal covers.

Figure 14:
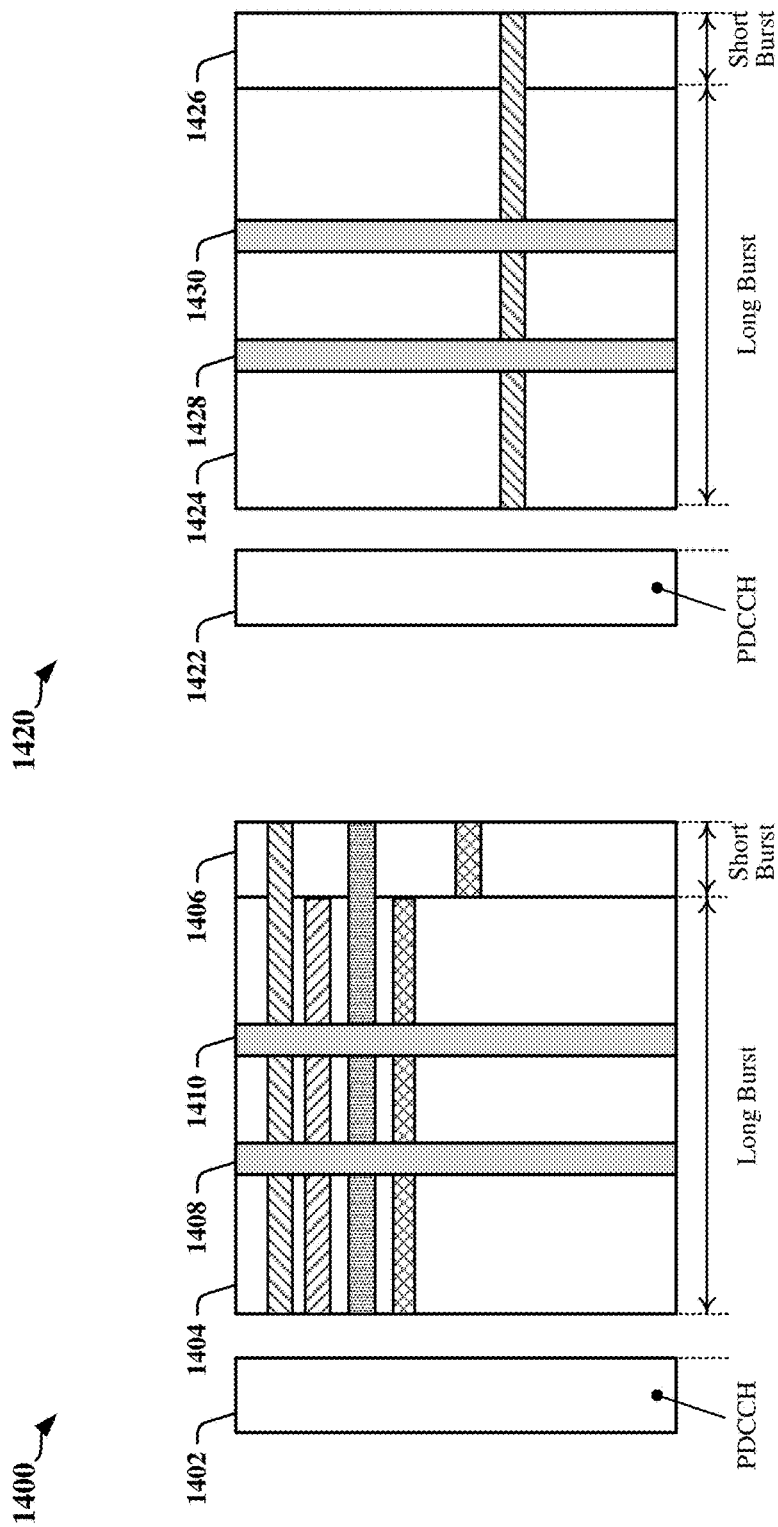
FIGS. 14 and 15 illustrate examples of uplink slots that illustrate the effect of a reference signal (RS) on control information transmitted in uplink slots configured according to some aspects of the disclosure over NR access networks when inter-slot frequency hopping is employed.
Figure 15:
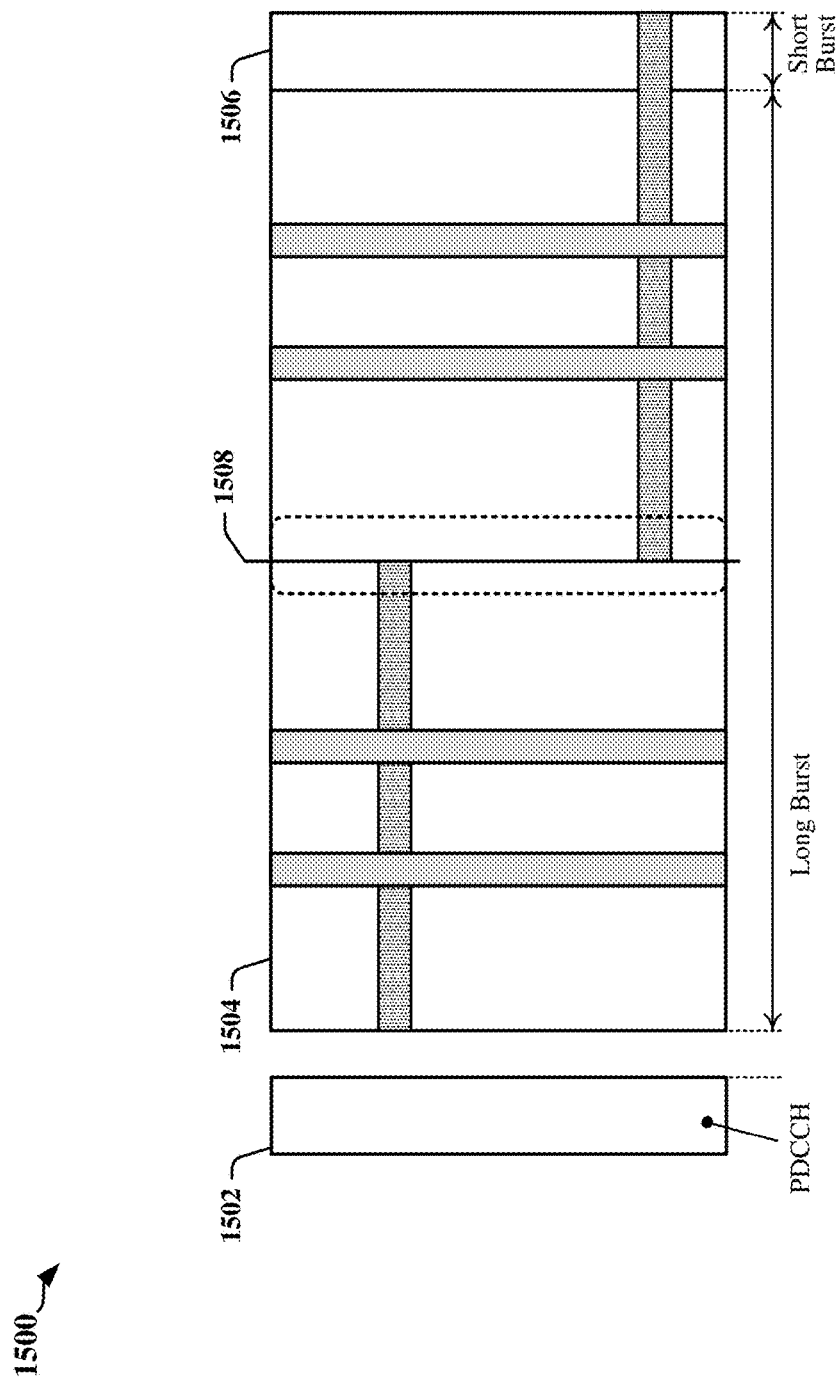

FIGS. 14 and 15 illustrate examples of uplink slots 1400, 1420, 1500 that illustrate the effect of a reference signal (RS) on PUCCH when inter-slot frequency hopping is employed. The PDCCH examples of FIGS. 14 and 15 may be compared and/or contrasted with the corresponding PDCCH transmissions in FIGS. 12 and 13. The slots 1400, 1420 have a 1-slot duration and include respective downlink portions 1402, 1422 that may be used to provide scheduling information. Each slot 1400, 1420 includes a long burst 1404, 1424 and a short burst 1406, 1426. A first-transmitted slot 1400 may immediately precede a second-transmitted slot 1420, and inter-slot frequency hopping is implemented. Frequency hopping may be performed at a fixed point between consecutive slots. FIG. 15 illustrates an example of an uplink slot 1500 that has a 2-slot duration with no downlink portion between slots. That is, a single long burst 1504 is transmitted followed by a short burst 1506. In this example, inter-slot frequency hopping may be implemented.

When inter-slot frequency hopping (cross-slot frequency hopping) is employed, fewer RS locations 1408, 1410, 1428, 1430 may be used than the number of RS locations 1208, 1210, 1212, 1214, 1228, 1230, 1232, 1234 used when intra-slot frequency hopping is used.

Split Symbols in Short Bursts

Figure 16:
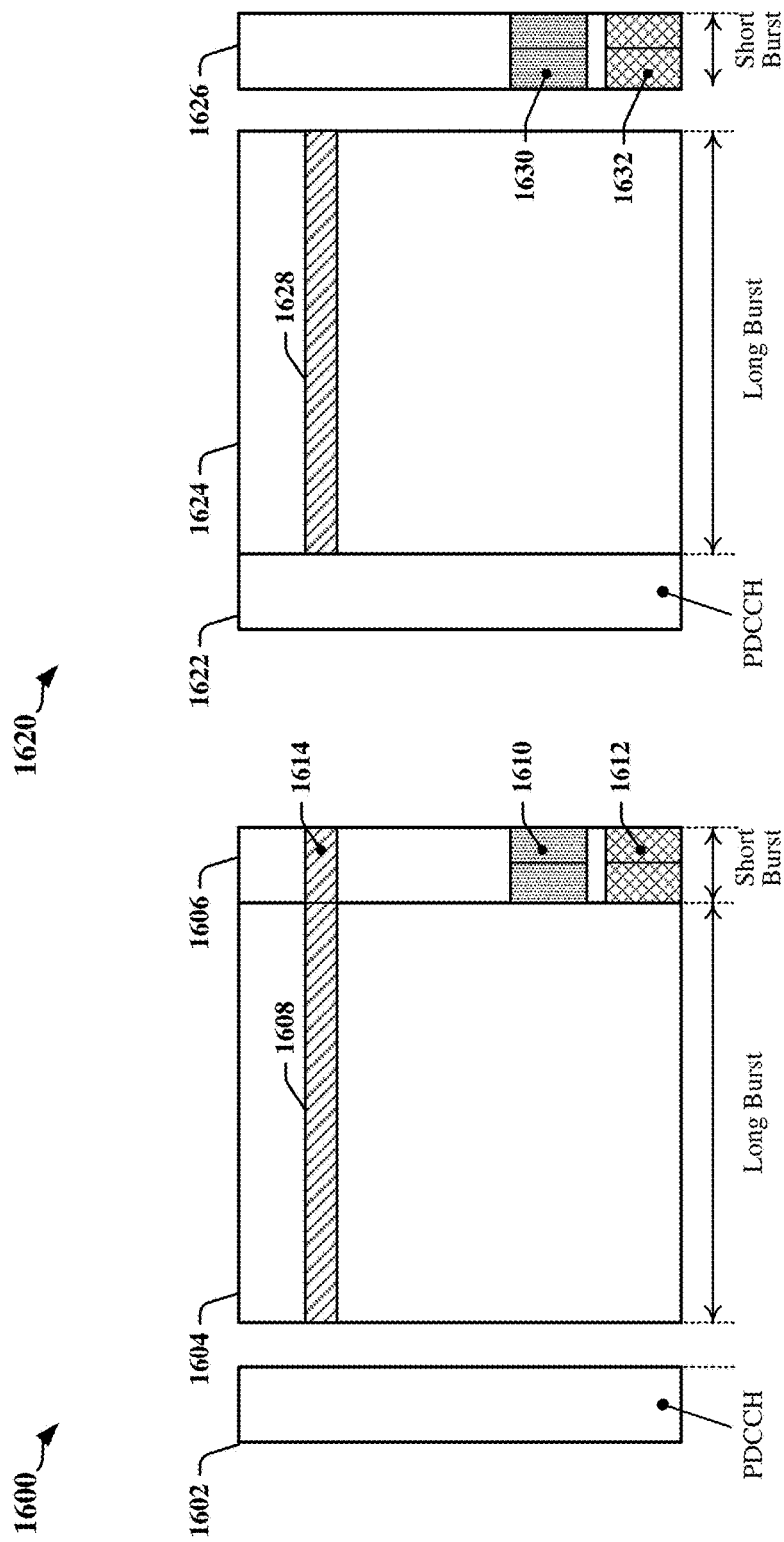
FIG. 16 illustrates examples of slots that include uplink short bursts which support sub-band split symbols according to some aspects of the disclosure.

FIG. 16 illustrates examples of slots 1600, 1620 that include uplink short bursts 1606, 1626 that support sub-band split symbols. The slots 1600, 1620 have a 1-slot duration and include respective PDCCH downlink portions 1602, 1622 that may be used to provide scheduling information, for example. The first slot 1600 includes an uplink long burst 1604 and an uplink short burst 1606 which may carry some combination of PUCCH symbols 1610 and PUSCH symbols 1612. A gap or guard period is provided between the PDCCH downlink portion 1602 and the uplink long burst 1604. The second slot 1620 includes a downlink long burst 1624 and an uplink short burst 1626 which may carry some combination of symbols for PUCCH 1630 and symbols for PUSCH 1632. A gap or guard period is provided between the downlink long burst 1624 and the uplink short burst 1626.

The PUCCH symbols 1610 and/or PUSCH symbols 1612 may include split symbols. A split symbol may be provided as a shortened duration OFDM symbol. Split symbols may be used for transmitting ACK information in a self-contained transmission that includes downlink data with an immediate uplink acknowledgement in the same slot. The ACK is transmitted after the data has been decoded. In some instances, there may be insufficient processing time to decode the data and generate an ACK response before the uplink short burst 1626 begins. The use of split symbol transmissions permits a pre-generated demodulation reference signal (DMRS) to be transmitted in a first half-symbol to allow time for the ACK response to be generated for transmission in the second half-symbol.

When split-symbol uplink short burst 1606 is used, the extension of PUCCH or PUSCH 1608 into the uplink short burst 1606 may result in extended PUCCH or PUSCH transmission 1614 that use the same symbol duration as the uplink short burst 1606. In this example, the extended PUCCH or PUSCH transmission 1614 may have different symbol duration from 1610 in the uplink short burst.

According to certain aspects, split symbols may be applied to PUSCH 1612, 1632 of the uplink short burst 1606, 1626, and symbols in the extended PUCCH or PUSCH transmission 1614 used to extend PUCCH or PUSCH 1608 are not split, and maintain the same tone spacing. PUCCH 1630 transmitted in the uplink short burst 1606, 1626 may use split symbol for additional processing gain. PUSCH 1612, 1632 may be transmitted in the uplink short burst 1606 with split symbol or in full symbols. In some instances, the uplink short burst 1606, 1626 may have a mixed numerology because of the use of split symbols. Mixed numerologies may prevent transmission of wideband SRS and may cause interference between the numerologies. SRS may be transmitted to a base station to allow the base station to estimate channel quality and optimize scheduling. In some instances, multiple SRS transmissions may be provided in the slot to channel estimation for different numerologies.

Figure 17:
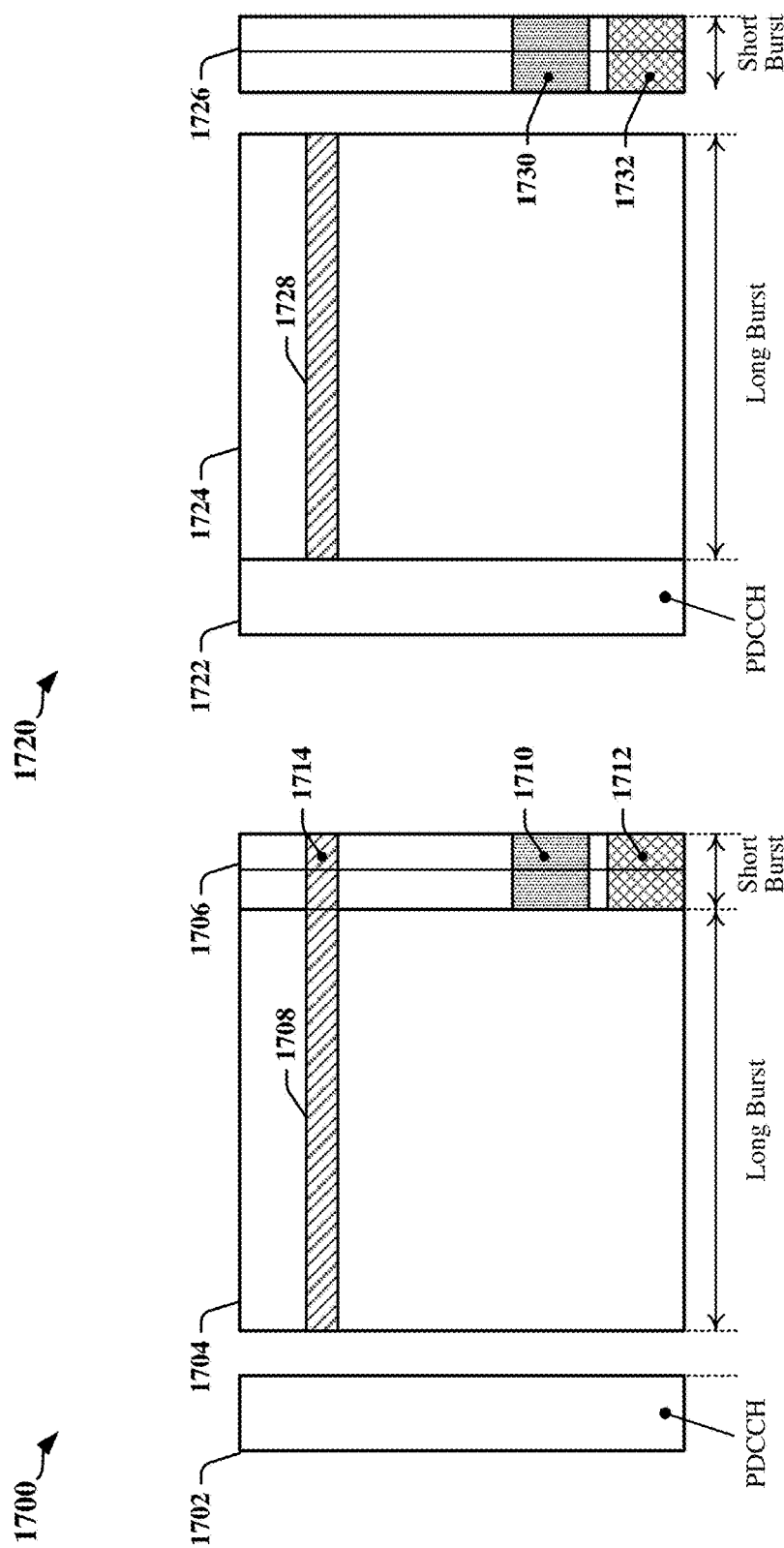
FIG. 17 illustrates examples of slots that include uplink short bursts which support full-band split symbols according to some aspects of the disclosure.

According to certain aspects, full-band split symbol may be implemented. FIG. 17 illustrates examples of slots 1700, 1720 that include uplink short bursts 1706, 1726 that support full-band split symbols. The slots 1700, 1670 have a 1-slot duration and include respective PDCCH downlink portions 1702, 1722 that may be used to provide scheduling information, for example. The first slot 1700 includes an uplink long burst 1704 and an uplink short burst 1706 which may carry some combination of PUCCH symbols 1710 and PUSCH symbols 1712. A gap or guard period is provided between the PDCCH downlink portion 1702 and the uplink long burst 1704. The second slot 1720 includes a downlink long burst 1724 and an uplink short burst 1726 which may carry some combination of PUCCH symbols 1730 and PUSCH symbols 1732. A gap or guard period is provided between the downlink long burst 1724 and the uplink short burst 1726.

As illustrated in FIG. 17, split symbol may be implemented for the entire short bursts 1706, 1726. For example, PUCCH 1708 transmitted in the long burst 1704 uses half-symbols in the uplink short burst 1706 when the PUCCH 1708 extended to the uplink short burst 1706. The receiver may reuse the channel estimation for the long burst 1704 by applying estimation to every other tone. Tone spacing is doubled for half-symbols with respect to full symbols. PUSCH in the uplink short burst 1706 is also transmitted in split symbols. The uplink short burst 1706 has a consistent or single numerology when split symbol is implemented for the entire short bursts 1706, 1726, and wideband SRS may be transmitted. When wideband SRS is transmitted for the uplink short burst 1706 that uses full-band split symbol, interference between different subbands can be eliminated.

Common PUCCH for Short Burst Occupying Less than Full Bandwidth

Figure 18:
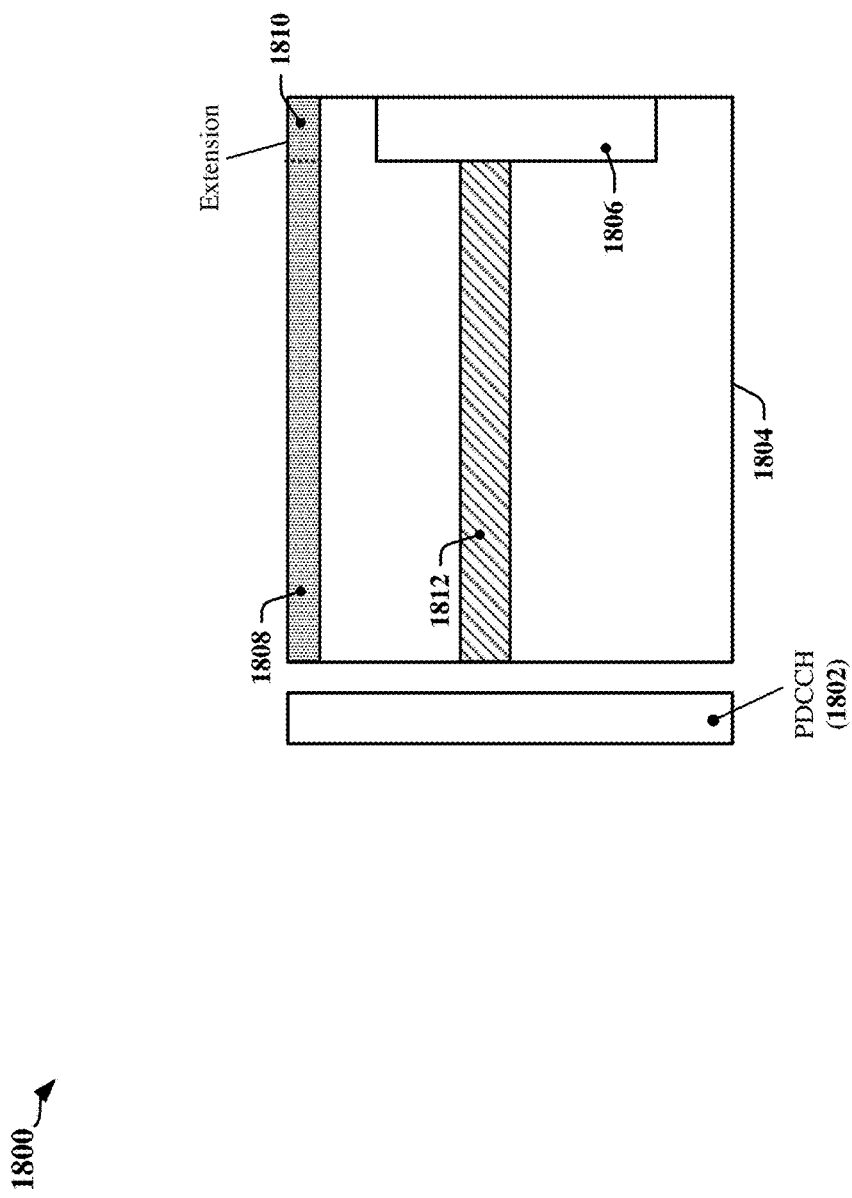
FIG. 18 illustrates an example of a slot that includes an uplink short burst that does not occupy the full bandwidth of the slot in accordance with certain aspects of the disclosure.

In some implementations, uplink slots may include short bursts that does not occupy the full bandwidth. FIG. 18 illustrates an example of an uplink slot 1800 that may be configured to carry PUCCH and/or PUSCH in a NR access network. In one example, the slot 1800 has a 1-slot duration. The slot 1800 includes a downlink portion 1802 used to provide scheduling information, and a long burst uplink portion 1804. The long burst uplink portion 1804 includes an embedded short burst portion 1806 which occupies less than all of the bandwidth. The slot 1800 may have a semi-static configuration that may be signaled in one or more SIBs. PUCCH or PUSCH 1808 may be extended through the use of resource blocks 1810 that are not included in the short burst portion 1806. Other PUCCH or PUSCH 1812 may not be extended into the short burst portion 1806.

In accordance with certain aspects disclosed herein, the uplink slot can be dynamically configured to selectively permit extension of PUCCH or PUSCH when the uplink slot includes a short burst portion that occupies less than all of the bandwidth.

Figure 19:
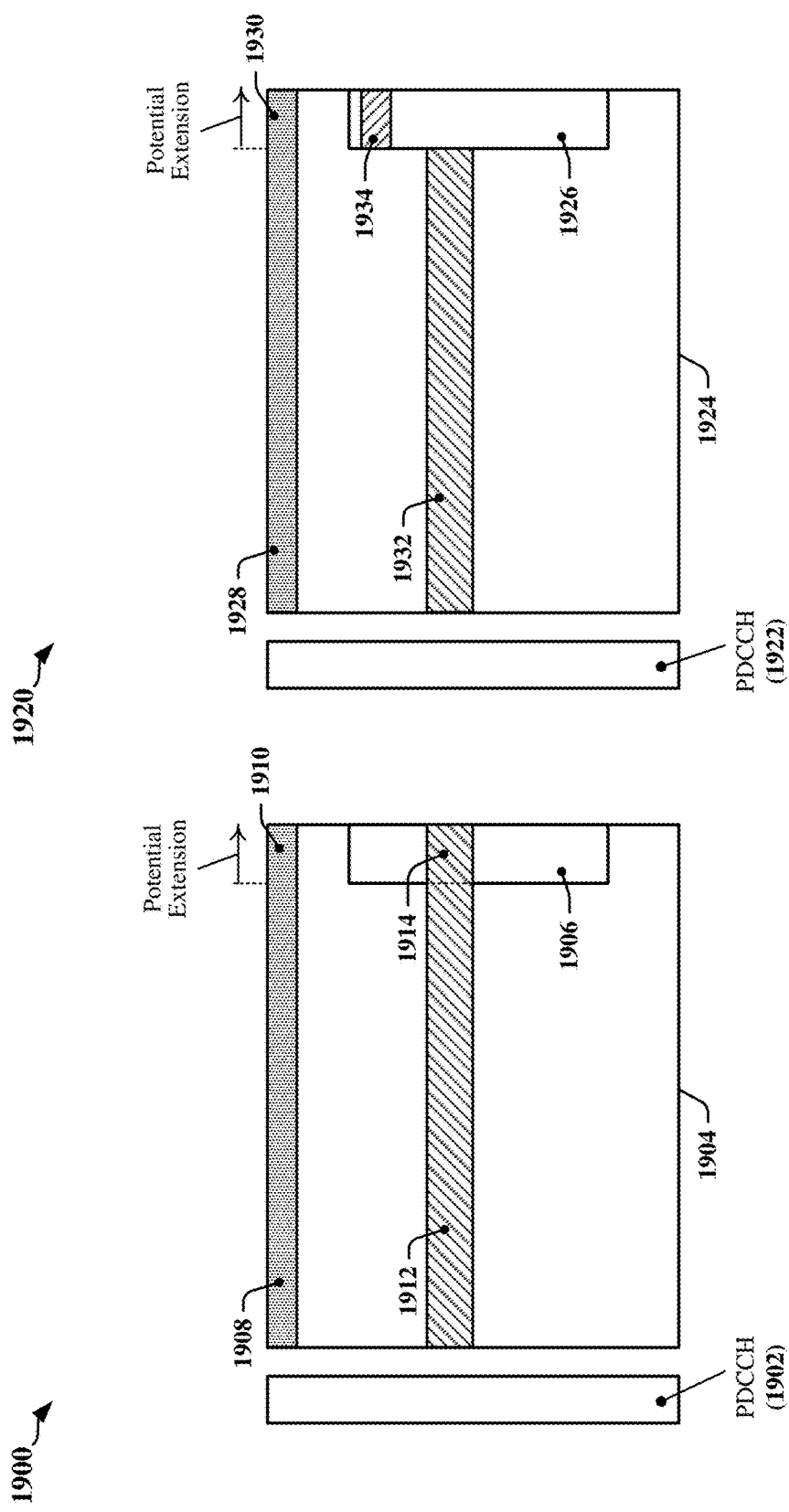
FIG. 19 illustrates cell-specific configuration of slots that include uplink short bursts that do not occupy the full bandwidth of the slots according to some aspects of the disclosure.

FIG. 19 illustrates cell-specific configuration of uplink slots 1900, 1920. In a first example, a slot 1900 is configured to carry PUCCH and/or PUSCH 1908, 1912 in a NR access network. The slot 1900 may include a downlink portion 1902 used to provide scheduling information, and a long burst uplink portion 1904. The long burst uplink portion 1904 includes an embedded short burst portion 1906 which occupies less than all of the bandwidth. PUCCH or PUSCH 1908 may be extended through the use of resource blocks 1910 that are not included in the short burst portion 1906. In this example, the short burst portion 1906 may be unoccupied and various UEs may extend PUCCH or PUSCH 1912 through the use of resource blocks 1914 provided within the short burst portion 1906.

In a second example, a slot 1920 is configured to carry PUCCH and/or PUSCH 1928, 1932 in a NR access network. The slot 1920 may include a downlink portion 1922 used to provide scheduling information, and a long burst uplink portion 1924. The long burst uplink portion 1924 includes an embedded short burst portion 1926 which occupies less than all of the bandwidth. PUCCH or PUSCH 1928 may be extended through the use of resource blocks 1930 that are not included in the short burst portion 1926. In this example, the short burst portion 1926 may include allocated resource blocks 1934 and UEs are not permitted to extend PUCCH or PUSCH 1932 into the short burst portion 1926.

The cell-specific configuration illustrated in FIG. 19 may be implemented using one-bit signaling that indicates whether the current uplink short burst portion 1906, 1926 is empty. The current uplink short burst portion 1906, 1926 may be empty when no UE is scheduled to use the uplink short burst portion 1906, 1926 to transmit information such as ACK, CQI, data, a scheduling request (SR), or data. In some instances, the one-bit signaling may be transmitted in a UE-specific grant, where transmission is duplicated for all UEs in the current slot. In some instances, the cell-specific signal may be provided, whereby the cell-specific signal is transmitted once and heard by all listening UEs. In one example, the one-bit signaling may represent a value of 1 when the current uplink short burst portion 1906, 1926 is empty, and extension into uplink short burst portion 1906, 1926 band in the current slot is permitted. In this example, the one-bit signaling may represent a value of 0 when the current uplink short burst portion 1906, 1926 is not empty and extension into uplink short burst portion 1906, 1926 band in the current slot is permitted.

Figure 20:
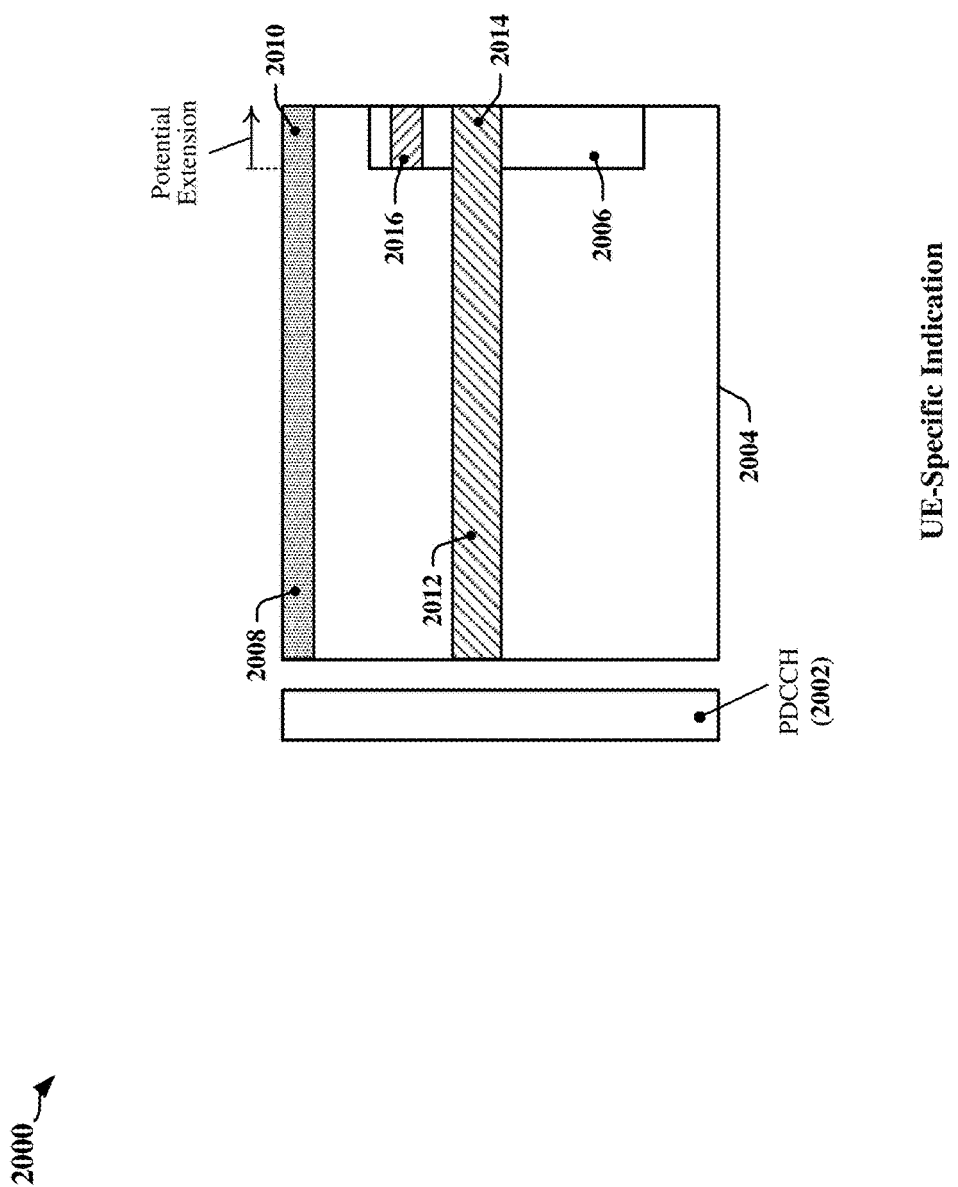
FIG. 20 illustrates UE-specific configuration of slots that include uplink short bursts that do not occupy the full bandwidth of the slots according to some aspects of the disclosure.

FIG. 20 illustrates UE-specific configuration of an uplink slot 2000. The slot 2000 is configured to carry PUCCH and/or PUSCH 2008, 2012 in a NR access network. The slot 2000 may include a downlink portion 2002 used to provide scheduling information, and a long burst uplink portion 2004. The long burst uplink portion 2004 includes an embedded short burst portion 2006 which occupies less than all of the bandwidth. PUCCH or PUSCH 2008 may be extended through the use of resource blocks 2010 that are not included in the short burst portion 2006.

When UE-specific configuration of the uplink slot 2000 is employed, a first UE may extend PUCCH or PUSCH 2012 through the use of resource blocks 2014 provided within the short burst portion 2006, when the resource blocks 2014 are not scheduled for use in the current slot. The first UE may extend the PUCCH or PUSCH 2012 even when other resource blocks 2016 in the short burst portion 2006 are occupied. Other UEs may not extend PUCCH or PUSCH to use resource blocks 2016 in the short burst portion 2006 that are not empty or that are scheduled for other purposes.

The UE-specific configuration illustrated in FIG. 20 may be implemented by transmitting one-bit signaling in the UE-specific grant indicating when extension into the uplink short burst portion 2006 is permitted. In one example, an eNB (or other scheduling entity) may permit extension when the resource blocks allocated to the UE for PUCCH or PUSCH 2012 are not used by other UEs in the uplink short burst portion 2006.

Scheduling Entity

Figure 21:
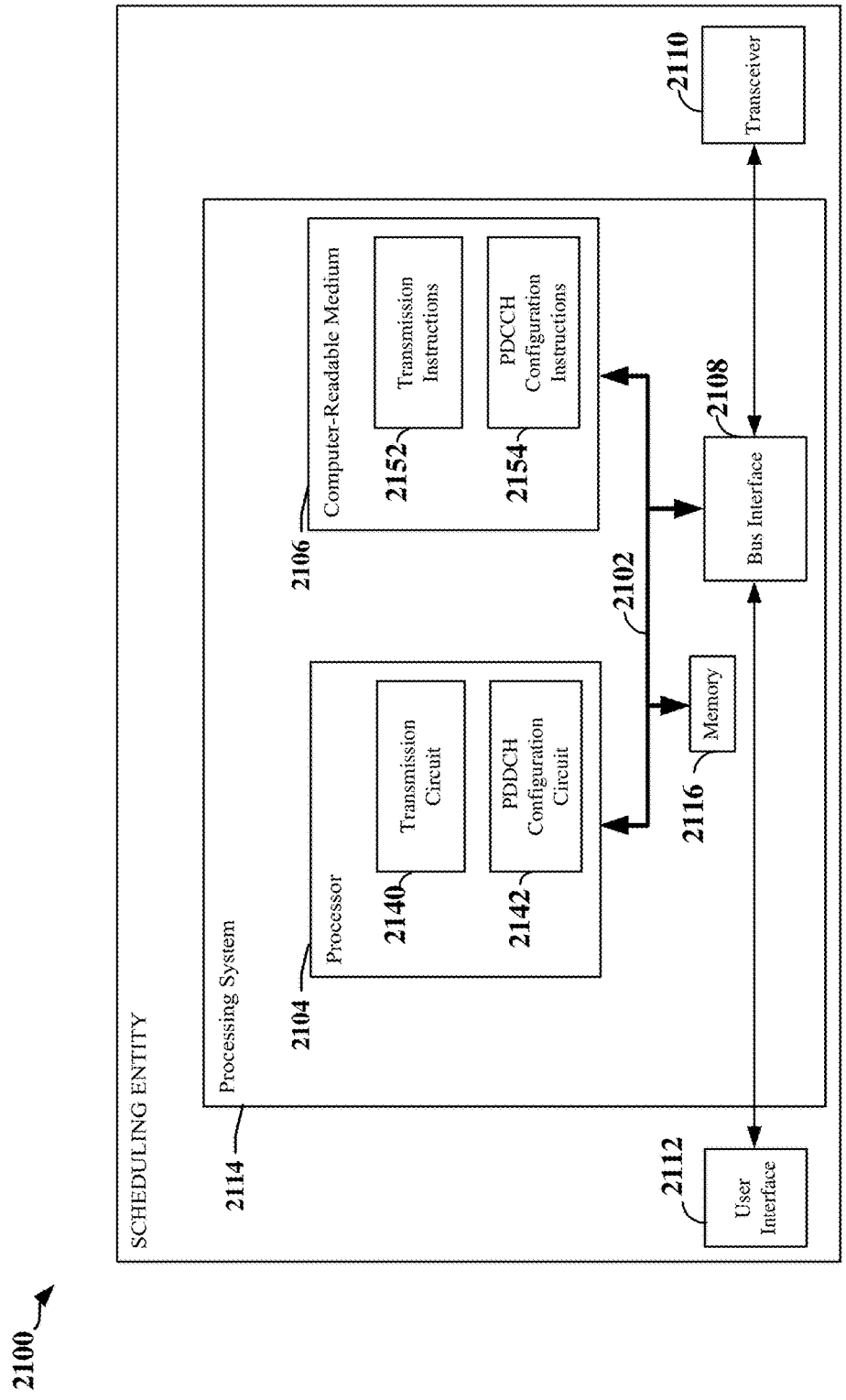
FIG. 21 is a block diagram illustrating an example of a hardware implementation for a scheduling entity employing a processing system according to one aspect of the disclosure.

FIG. 21 is a block diagram illustrating an example of a hardware implementation for a scheduling entity 2100 employing a processing system 2114. For example, the scheduling entity 2100 may be a user equipment (UE) as illustrated in FIG. 1 and/or FIG. 2. In another example, the scheduling entity 2100 may be a base station as illustrated in any one or more of FIG. 1 and/or FIG. 2.

The scheduling entity 2100 may be implemented with a processing system 2114 that includes one or more processors 2104. Examples of processors 2104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 2100 may be configured to perform any one or more of the functions described herein. That is, the processor 2104, as utilized in a scheduling entity 2100, may be used to implement any one or more of the processes and procedures described below and illustrated in FIG. 23.

In this example, the processing system 2114 may be implemented with a bus architecture, represented generally by the bus 2102. The bus 2102 may include any number of interconnecting buses and bridges depending on the specific application of the processing system 2114 and the overall design constraints. The bus 2102 communicatively couples together various circuits including one or more processors (represented generally by the processor 2104), a memory 2116, and computer-readable media (represented generally by the computer-readable storage medium 2106). The bus 2102 may also link various other circuits such as timing sources, peripherals, voltage regulators, and power management circuits, which are well known in the art, and therefore, will not be described any further. A bus interface 2108 provides an interface between the bus 2102 and a transceiver 2110. The transceiver 2110 provides a communication interface or means for communicating with various other apparatus over a transmission medium. Depending upon the nature of the apparatus, a user interface 2112 (e.g., keypad, display, speaker, microphone, joystick) may also be provided.

In some aspects of the disclosure, the processing system 2114 may include circuitry 2104, 2108, 2110, 2140, 2142 configured for various functions, including, for example, circuitry 2104, 2108, 2110, 2140 configured to format and transmit slots including PDCCH.

The processor 2104 is responsible for managing the bus 2102 and general processing, including the execution of software stored on the computer-readable storage medium 2106. The software, when executed by the processor 2104, causes the processing system 2114 to perform the various functions described below for any particular apparatus. The computer-readable storage medium 2106 and the memory 2116 may also be used for storing data that is manipulated by the processor 2104 when executing software.

One or more processors 2104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 2106. The computer-readable storage medium 2106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable storage medium 2106 may reside in the processing system 2114, external to the processing system 2114, or distributed across multiple entities including the processing system 2114. The computer-readable storage medium 2106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In one or more examples, the computer-readable storage medium 2106 may include software configured for various functions, including, for example, transmitting first uplink control information from a subordinate entity to a scheduling entity in a long burst portion of one or more slots, and transmitting second uplink control information from the subordinate entity to the scheduling entity in a combination of long burst and short burst portions of the one or more slots. Each of the one or more slots includes a portion that carries a PDCCH.

Scheduled Entity

Figure 22:
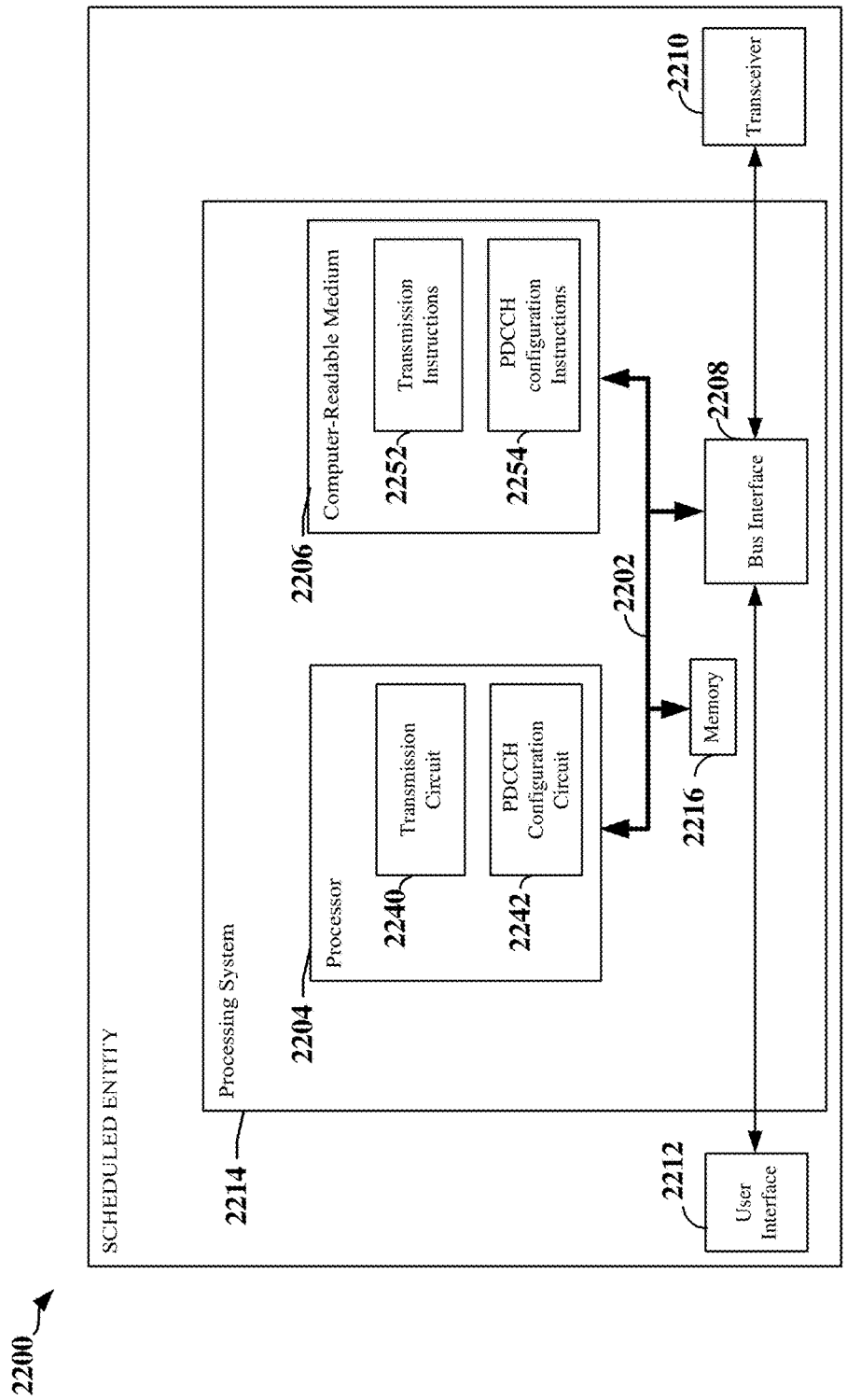
FIG. 22 is a block diagram illustrating an example of a hardware implementation for a subordinate entity employing a processing system according to one aspect of the disclosure.

FIG. 22 is a conceptual diagram illustrating an example of a hardware implementation for an exemplary scheduled entity 2200 employing a processing system 2214. In accordance with various aspects of the disclosure, an element, or any portion of an element, or any combination of elements may be implemented with a processing system 2214 that includes one or more processors 2204. For example, the scheduled entity 2200 may be a user equipment (UE) as illustrated in any one or more of FIG. 1 and/or FIG. 2.

The processing system 2214 may be substantially the same as the processing system 2114 illustrated in FIG. 21, including a bus interface 2208, a bus 2202, memory 2216, a processor 2204, and a computer-readable medium 2206. Furthermore, the scheduled entity 2200 may include a user interface 2212 and a transceiver 2210 substantially similar to those described above in FIG. 21. That is, the processor 2204, as utilized in a scheduled entity 2200, may be used to implement any one or more of the processes described below and illustrated in FIG. 23.

In some aspects of the disclosure, the processing system 2214 may include circuitry 2204, 2208, 2210, 2240, 2242 configured for various functions, including, for example, circuitry 2204, 2208, 2210, 2240 configured to format and transmit slots including PDCCH.

Figure 23:
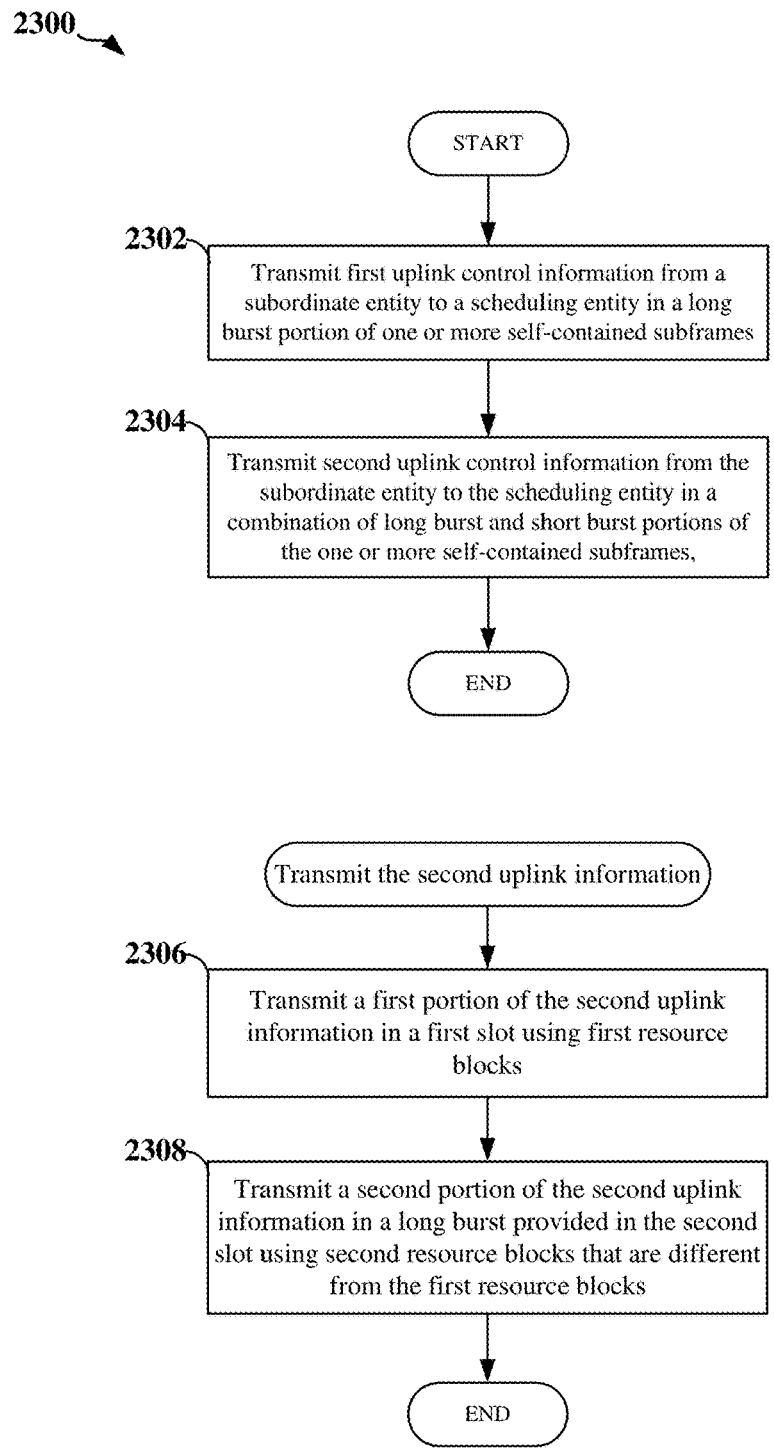
FIG. 23 is a flowchart illustrating a wireless communication process in accordance with certain aspects of the present disclosure.

FIG. 23 is a flow chart illustrating an example of a process 2300 for wireless communication in accordance with certain aspects of the present disclosure. As described below, some or all illustrated features may be omitted in a particular implementation within the scope of the present disclosure, and some illustrated features may not be required for implementation of all embodiments. In some examples, the process 2300 may be carried out by a UE such as the scheduled entity 2200 illustrated in FIG. 21. In some examples, the process 2300 may be carried out by any suitable apparatus or means for carrying out the functions or algorithm described below.

At block 2302, apparatus may transmit first uplink control information to a scheduling entity in a long burst portion of one or more slots.

At block 2304, the apparatus may transmit second uplink control information from the subordinate entity to the scheduling entity in a combination of long burst and short burst portions of the one or more slots. In some examples, each of the one or more slots includes a portion that carries PDCCH.

In various examples, each of the one or more slots includes at least two slots.

At block 2306, the apparatus may transmit the second uplink information by transmitting a first portion of the second uplink information in a first slot using first resource blocks, and at block 2308, transmitting a second portion of the second uplink information in a long burst provided in the second slot using second resource blocks that are different from the first resource blocks.

In certain examples, the second uplink control information is transmitted in PUCCH. The PUCCH may be transmitted in the short burst portion using subcarriers that are used for transmitting the PUCCH in the long burst. The PUCCH may be transmitted in the short burst portion using at least some subcarriers that are different from subcarriers used to transmit the PUCCH in the long burst.

In certain examples, each of the one or more slots comprises a single slot. The subordinate entity may transmit the second uplink control information by transmitting a first portion of the second uplink control information in a long burst of a first slot, and transmit a second portion of the second uplink control information in a long burst of a second slot. The subordinate entity may transmit the second uplink control information by transmitting a third portion of the second uplink control information in a short burst of the first slot.

In some examples, each of the one or more slots comprises at least two slots. The subordinate entity may transmit the second uplink control information by transmitting a first portion of the second uplink control information in a long burst spanning the at least two slots, and transmitting a second portion of the second uplink control information in a short burst of each slot.

In certain examples, the subordinate entity may transmit the second uplink control information by transmitting a first portion of the second uplink control information in a first portion of a long burst of a first slot using first resource blocks, and transmitting a second portion of the second uplink control information in a second portion of the long burst of the first slot using second resource blocks that are different from the first resource blocks. The subordinate entity may transmit the second uplink control information by transmitting a third portion of the second uplink control information in a short burst of the first slot. The subordinate entity may transmit the second uplink control information by transmitting a fourth portion of the second uplink control information in a first portion of a long burst of a second slot using third resource blocks, and transmitting a fifth portion of the second uplink control information in a second portion of the long burst of the second slot using fourth resource blocks that are different from the third resource blocks. Each of the second resource blocks may be different from the third resource blocks.

In some examples, the subordinate entity may transmit third uplink control information from the subordinate entity to the scheduling entity in split symbols transmitted in the short burst portions of the one or more slots.

In one example, each symbol transmitted in the short burst portions is a split symbol.

In certain examples, the first uplink control information and the second uplink control information is transmitted in a PUCCH or a PUSCH. The PUCCH may be transmitted in the short burst portion using at least some subcarriers that are different from subcarriers used to transmit the PUCCH in the long burst, or the PUSCH is transmitted in the short burst portion using at least some subcarriers that are different from subcarriers used to transmit the PUSCH in the long burst.

In some examples, each of one or more slots comprises at least two slots and the second uplink control information may be transmitted by transmitting a first portion of the second uplink control information in a first slot using first resource blocks, and transmitting a second portion of the second uplink control information in a long burst provided in the second slot using second resource blocks that are different from the first resource blocks. A frequency-hopping point defined between the first slot and the second slot may be constant for two or more slots regardless of configuration of a control channel that carries the second uplink control information. The frequency-hopping point may determine whether first resource blocks or second resource blocks are used. The location of the frequency-hopping point between the first slot and the second slot may be defined based on a number of symbols provided in the PDCCH. In some implementations, a frequency-hopping point is defined between the first slot and the second slot is on every slot boundary.

In some examples, a frequency-hopping point is defined between first and second portions of long bursts in each of a plurality of slots that have a common configuration. Location of the frequency-hopping point may be fixed regardless of configuration of a control channel that carries the second uplink control information. The frequency-hopping point may determine whether first resource blocks or second resource blocks are used.

In some instances, RS is provided in the one or more slots. Locations of the RS in the one or more slots may be fixed regardless of configuration of a control channel that carries the second uplink information. In one example, the locations of the RS in the one or more slots are determined based on payload size. In another example, the locations of the RS in the one or more slots are determined based on a number of symbols in the PDCCH. In another example, the locations of the RS in the one or more slots are determined based on whether half-slot or inter-slot frequency-hopping is configured for the one or more slots.

In some examples, the short burst portions of the one or more slots include less than the full bandwidth allocated to the one or more slots. The subordinate entity may receive signaling indicating whether resource blocks used for transmitting the second uplink information in the long burst portion are available to the subordinate entity in the short burst portion. Based on the signaling, the subordinate entity may transmit the second uplink information in the short burst portion when the resource blocks are available to the subordinate entity, or refrain from transmitting the second uplink information in the short burst portion when the resource blocks are available to the subordinate entity. Availability of the short burst portion to the subordinate entity may be semi-statically configured when the signaling is transmitted in a grant associated with the subordinate entity. Availability of the short burst portion to the subordinate entity may be dynamically configured. For example, the signaling may be specifically directed to the subordinate entity and may dynamically configure availability of the short burst portion to the subordinate entity. In another example, the signaling may dynamically enable or disable access to the short burst portion for all subordinate entities in a plurality of subordinate entities scheduled by the scheduling entity. In some examples, the signaling of bandwidth reserved for short burst portion is broadcast to the subordinate entity. The signaling may dynamically enable or disable access to the short burst portion for individual subordinate entities in a plurality of subordinate entities scheduled by the scheduling entity.

In one configuration, an apparatus for wireless communication includes means for transmitting first uplink control information from a subordinate entity to a scheduling entity in a long burst portion of one or more slots, and means for transmitting second uplink control information from the subordinate entity to the scheduling entity in a combination of long burst and short burst portions of the one or more slots. Each of the one or more slots may include a portion that carries a PDCCH. In one aspect, the aforementioned means may be the processor(s) 2104, 2204 configured to perform the functions recited by the aforementioned means. In another aspect, the aforementioned means may be a circuit or any apparatus configured to perform the functions recited by the aforementioned means.

Of course, in the above examples, the circuitry included in the processor 2104, 2204 is merely provided as an example, and other means for carrying out the described functions may be included within various aspects of the present disclosure, including but not limited to the instructions stored in the computer-readable storage medium 2106, 2206 and/or other memory 2116, 2216, or any other suitable apparatus or means described in any one of the FIGS. 21 and/or 22, and utilizing, for example, the processes and/or algorithms described herein in relation to FIG. 23.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIG. 23 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 21 and/or 22 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication, comprising:
   transmitting first uplink information from a subordinate entity to a scheduling entity in a long burst portion of at least one slot in a plurality of slots; and
   transmitting second uplink information from the subordinate entity to the scheduling entity in a long burst portion, a short burst portion or a combination of long burst and short burst portions of at least two slots in the plurality of slots, and wherein in a first mode transmitting the second uplink information comprises:
      transmitting a first portion of the second uplink information in a first slot using first resource blocks; and
      transmitting a second portion of the second uplink information in a long burst portion provided in a second slot using second resource blocks that are different from the first resource blocks, wherein the first resource blocks and the second resource blocks define different sets of subcarriers used for transmitting information.

2. The method of claim 1, wherein the first uplink information and the second uplink information is transmitted in a physical uplink control channel (PUCCH) or in a physical uplink shared channel (PUSCH).

3. The method of claim 2, wherein the PUCCH or PUSCH is transmitted in the short burst portion using subcarriers that are used for transmitting the PUCCH or PUSCH in the long burst.

4. The method of claim 1, wherein:
   the first uplink information and the second uplink information is transmitted in a physical uplink control channel (PUCCH) or a physical uplink shared channel (PUSCH), and
   wherein the PUCCH is transmitted in the short burst portion using at least some subcarriers that are different from subcarriers used to transmit the PUCCH in the long burst, or the PUSCH is transmitted in the short burst portion using at least some subcarriers that are different from subcarriers used to transmit the PUSCH in the long burst.

5. The method of claim 1, wherein transmitting the second uplink information comprises:
   transmitting the first portion of the second uplink information in a long burst of the first slot.

6. The method of claim 1, wherein in a second mode transmitting the second uplink information comprises:
   transmitting a first part of the second uplink information in a first slot using first resource blocks;
   transmitting a second part of the second uplink information in a long burst provided in a second slot using second resource blocks that are different from the first resource blocks; and
   transmitting a third part of the second uplink information in a short burst of the first slot using the first resource blocks.

7. The method of claim 1, wherein in a third mode transmitting the second uplink information comprises:
   transmitting a first part of the second uplink information in a long burst spanning the at least two slots; and
   transmitting a second part of the second uplink information in a short burst of each slot of the at least two slots.

8. The method of claim 1, wherein each of the at least two slots includes a portion that carries a physical downlink control channel (PDCCH).

9. The method of claim 8, wherein a frequency-hopping point defined between the first slot and the second slot is constant for two or more slots regardless of configuration of a channel that carries the second uplink information, wherein the frequency-hopping point determines whether first resource blocks or second resource blocks are used, and wherein location of the frequency-hopping point between the first slot and the second slot is defined based on a number of symbols provided in the PDCCH.

10. The method of claim 1, wherein in a fourth mode transmitting the second uplink information comprises:
    transmitting a first part of the second uplink information in a portion of a first long burst of the first slot that uses a first set of subcarriers; and
    transmitting a second part of the second uplink information in a portion of a second long burst of the first slot that uses a second set of subcarriers.

11. The method of claim 10, wherein transmitting the second uplink information comprises:
    transmitting a third portion of the second uplink information in a short burst of the first slot.

12. The method of claim 10, wherein transmitting the second uplink information comprises:
    transmitting a fourth portion of the second uplink information in a first portion of a long burst of a second slot using third resource blocks; and
    transmitting a fifth portion of the second uplink information in a second portion of the long burst of the second slot using fourth resource blocks that are different from the third resource blocks, wherein each of the second resource blocks are different from the third resource blocks.

13. The method of claim 10, wherein a frequency-hopping point is defined between first and second portions of long bursts in each of a plurality of slots that have a common configuration, wherein location of the frequency-hopping point is fixed regardless of configuration of a control channel that carries the second uplink information, wherein the frequency-hopping point determines whether first resource blocks or second resource blocks are used, and wherein the frequency-hopping point in each slot is defined based on a number of symbols provided in a PDCCH.

14. The method of claim 1, wherein the short burst portions of the one or more slots comprise split symbols, further comprising:
    transmitting third uplink information from the subordinate entity to the scheduling entity in the split symbols transmitted in the short burst portions of the one or more slots.

15. The method of claim 1, wherein each symbol transmitted in the short burst portions of the one or more slots is a split symbol.

16. The method of claim 1, further comprising:
    providing a reference signal (RS) in the one or more slots, wherein locations of the RS in the one or more slots is determined based on size of a data payload carried by the plurality of slots and fixed regardless of configuration of a control channel that carries the second uplink information.

17. The method of claim 16, wherein the locations of the RS in the one or more slots are determined based on a number of symbols in a PDCCH, or based on whether half-slot or inter-slot frequency-hopping is configured for the one or more slots.

18. The method of claim 1, wherein the short burst portions of the one or more slots include less than full bandwidth allocated to the one or more slots, further comprising:
    receiving signaling indicating whether resource blocks used for transmitting the second uplink information in the long burst portion are available to the subordinate entity in the short burst portion;
    transmitting the second uplink information in the short burst portion when the resource blocks are available to the subordinate entity; and
    refraining from transmitting the second uplink information in the short burst portion when the resource blocks are unavailable to the subordinate entity.

19. The method of claim 18, wherein availability of the short burst portion to the subordinate entity is semi-statically configured.

20. The method of claim 18, wherein signaling of bandwidth reserved for short burst portion is broadcast to the subordinate entity.

21. The method of claim 18, wherein the signaling is specifically directed to the subordinate entity and dynamically configures availability of the short burst portion to the subordinate entity.

22. The method of claim 18, wherein the signaling dynamically enables or disables access to the short burst portion for all subordinate entities in a plurality of subordinate entities scheduled by the scheduling entity.

23. The method of claim 18, wherein the signaling dynamically enables or disables access to the short burst portion for individual subordinate entities in a plurality of subordinate entities scheduled by the scheduling entity.

24. An apparatus, comprising:
    means for transmitting first uplink information from a subordinate entity to a scheduling entity in a long burst portion of at least one slot in a plurality of slots; and
    means for transmitting second uplink information from the subordinate entity to the scheduling entity in a long burst portion, a short burst portion or a combination of long burst and short burst portions of at least two slots in the plurality of slots, wherein the means for transmitting the second uplink information is operable in a first mode to:
        transmit a first portion of the second uplink information in a first slot of the at least two slots using first resource blocks; and
        transmit a second portion of the second uplink information in a long burst provided in a second slot of the at least two slots using second resource blocks that are different from the first resource blocks, wherein the first resource blocks and the second resource blocks define different sets of subcarriers used for transmitting information.

25. The apparatus of claim 24, wherein a physical uplink control channel (PUCCH) is transmitted in the short burst portion using at least some subcarriers that are different from subcarriers used to transmit the PUCCH in the long burst.

26. The apparatus of claim 24, wherein the means for transmitting the second uplink information is configured in a second mode to:
    transmit a first part of the second uplink information in a long burst of first slot of the at least two slots using the first resource blocks;
    transmit a second part of the second uplink information in the long burst provided in the second slot; and
    transmit a third part of the second uplink information in a short burst of the first slot.

27. The apparatus of claim 24, wherein the means for transmitting the second uplink information is configured in a third mode to:
    transmit a first part of the second uplink information in a first portion of a long burst of a first slot using the first resource blocks;
    transmit a second part of the second uplink information in a second portion of the long burst of the first slot using the second resource blocks;
    transmit a second part of the second uplink information in a short burst of the first slot;
    transmit a second part of the second uplink information in a first portion of a long burst of a second slot using third resource blocks; and
    transmit a second part of the second uplink information in a second portion of the long burst of the second slot using fourth resource blocks that are different from the third resource blocks,
    wherein each of the second resource blocks are different from the third resource blocks.

28. The apparatus of claim 24, wherein the short burst portions of the one or more slots comprise split symbols, further comprising:
    means for transmitting third uplink information from the subordinate entity to the scheduling entity in the split symbols transmitted in the short burst portions of at least two slots.

29. A non-transitory computer-readable medium storing computer-executable code, comprising code for causing a computer to:
    transmit first uplink information from a subordinate entity to a scheduling entity in a long burst portion of at least one slot in a plurality of slots;

transmit second uplink information from the subordinate entity to the scheduling entity in a long burst portion, a short burst portion or a combination of long burst and short burst portions of at least two slots in the plurality of slots;
transmit a first portion of the second uplink information in a first slot using first resource blocks; and
transmit a second portion of the second uplink information in a long burst provided in a second slot using second resource blocks that are different from the first resource blocks, wherein the first resource blocks and the second resource blocks define different sets of subcarriers used for transmitting information.

30. An apparatus for wireless communication, comprising:
at least one processor;
a transceiver communicatively coupled to the at least one processor; and
a memory communicatively coupled to the at least one processor,
wherein the processor is configured to:
transmit first uplink information from a subordinate entity to a scheduling entity in a long burst portion of at least one slot in a plurality of slots;
transmit second uplink information from the subordinate entity to the scheduling entity in a long burst portion, a short burst portion or a combination of long burst and short burst portions of at least two slots in the plurality of slots;
transmit a first portion of the second uplink information in a first slot using first resource blocks; and
transmit a second portion of the second uplink information in a long burst provided in a second slot using second resource blocks that are different from the first resource blocks, wherein the first resource blocks and the second resource blocks define different sets of subcarriers used for transmitting information.

* * * * *